(12) United States Patent
Van Dalen et al.

(10) Patent No.: US 8,684,743 B2
(45) Date of Patent: Apr. 1, 2014

(54) MODEL HUMAN EYE AND FACE MANIKIN FOR USE THEREWITH

(75) Inventors: Johan T. W. Van Dalen, Tucson, AZ (US); Dan D. Carda, Tucson, AZ (US)

(73) Assignee: Eye Care and Cure Pte. Ltd, Singapore (SG)

(*) Notice: Subject to any disclaimer, the term of this patent is extended or adjusted under 35 U.S.C. 154(b) by 299 days.

(21) Appl. No.: 13/189,434

(22) Filed: Jul. 22, 2011

(65) Prior Publication Data
US 2012/0021397 A1 Jan. 26, 2012

Related U.S. Application Data

(60) Provisional application No. 61/367,335, filed on Jul. 23, 2010.

(51) Int. Cl.
*G09B 23/30* (2006.01)

(52) U.S. Cl.
USPC ............................... 434/267; 434/271

(58) Field of Classification Search
USPC ................................. 434/267, 271
See application file for complete search history.

(56) References Cited

U.S. PATENT DOCUMENTS

| | | | |
|---|---|---|---|
| 1,042,815 A | | 10/1912 | Myers |
| 1,476,621 A | * | 12/1923 | Kintner ..................... 434/271 |
| 1,881,602 A | * | 10/1932 | Hughes ..................... 434/271 |
| 1,981,964 A | * | 11/1934 | McFadden ................. 434/271 |
| 2,068,950 A | * | 1/1937 | Hamilton ................... 434/271 |
| 2,670,569 A | | 3/1954 | Heina |
| 4,710,193 A | | 12/1987 | Volk |
| 4,865,552 A | | 9/1989 | Maloney et al. |
| 5,195,896 A | | 3/1993 | Sweeney et al. |
| 5,561,137 A | | 10/1996 | Or et al. |
| 5,893,719 A | | 4/1999 | Radow |

(Continued)

FOREIGN PATENT DOCUMENTS

| | | |
|---|---|---|
| EP | 1193664 A2 | 4/2002 |
| JP | 2007127708 A | 5/2007 |
| WO | 2009152582 A1 | 12/2009 |

OTHER PUBLICATIONS

Gray, Anatomy of the human body [20, section 1c.1. The Tunics of the Eye], 1918, [Retreived from http://www.bartleby.com/107/225.html].

(Continued)

*Primary Examiner* — Benjamin Layno
(74) *Attorney, Agent, or Firm* — Dale F. Regelman; Quarles & Brady LLP

(57) ABSTRACT

A model human eye that is structurally suited for practicing surgical techniques, including extraocular muscle resection and recession, is presented. The model eye comprises a hemispherical-shaped, bottom assembly having multiple retinal layers and a hemispherical-shaped, integrally molded top assembly having a visually transparent cornea portion surrounding a visually opaque sclera portion. The model eye further comprises an annular iris, a lenticular bag, an anterior chamber having a first fluid disposed therein, and a posterior chamber having a second fluid disposed therein. The model human eye further comprises a cylindrical member extending outwardly from the sclera portion, where the cylindrical member mimics an optic nerve, and a cone-shaped elastomeric assembly attached to a distal end of the cylindrical member and having four elastomeric members extending outwardly, where a distal end of each elastomeric member is attached to the sclera portion, and where each of the elastomeric members mimics a rectus muscle.

19 Claims, 26 Drawing Sheets

(56) References Cited

U.S. PATENT DOCUMENTS

| | | | |
|---|---|---|---|
| 5,964,776 | A | 10/1999 | Peyman |
| 6,887,083 | B2 | 5/2005 | Umeyama et al. |
| 6,902,404 | B2 * | 6/2005 | Johnson, Jr. .................. 434/271 |
| 6,923,654 | B2 | 8/2005 | Johnson |
| 6,942,695 | B1 | 9/2005 | Chapoy et al. |
| 7,066,598 | B2 | 6/2006 | Niven |
| 8,128,412 | B2 | 3/2012 | Carda et al. |
| 8,137,111 | B2 | 3/2012 | Carda et al. |
| 2002/0028429 | A1 | 3/2002 | Umeyama et al. |
| 2004/0097166 | A1 | 5/2004 | Maddocks et al. |
| 2004/0189934 | A1 | 9/2004 | Niven |
| 2007/0254841 | A1 | 11/2007 | Ousler et al. |
| 2008/0227073 | A1 | 9/2008 | Bardsley et al. |
| 2009/0004637 | A1 | 1/2009 | Carda et al. |

OTHER PUBLICATIONS

Martola et al., Central and Peripheral Corneal Thickness, A Clinical Study, 1968, Archives of Ophthamology, 79 (1):28-30.

Bores, Ocular Anatomy, Aug. 23, 2002, pp. 3.

Kolb et al., Gross Anatomy of the Eye, Jan. 20, 2005, pp. 2.

PCT/US2008/68665—International Search Report and Written Opinion dated Sep. 9, 2010.

2008801014894—Chinese Office Action dated Nov. 23, 2011.

EP087722047—Supplementary EU Search Report dated Oct. 6, 2011.

PCT/US2012/047895—International Search Report and Written Opinion dated Jan. 29, 2013.

* cited by examiner

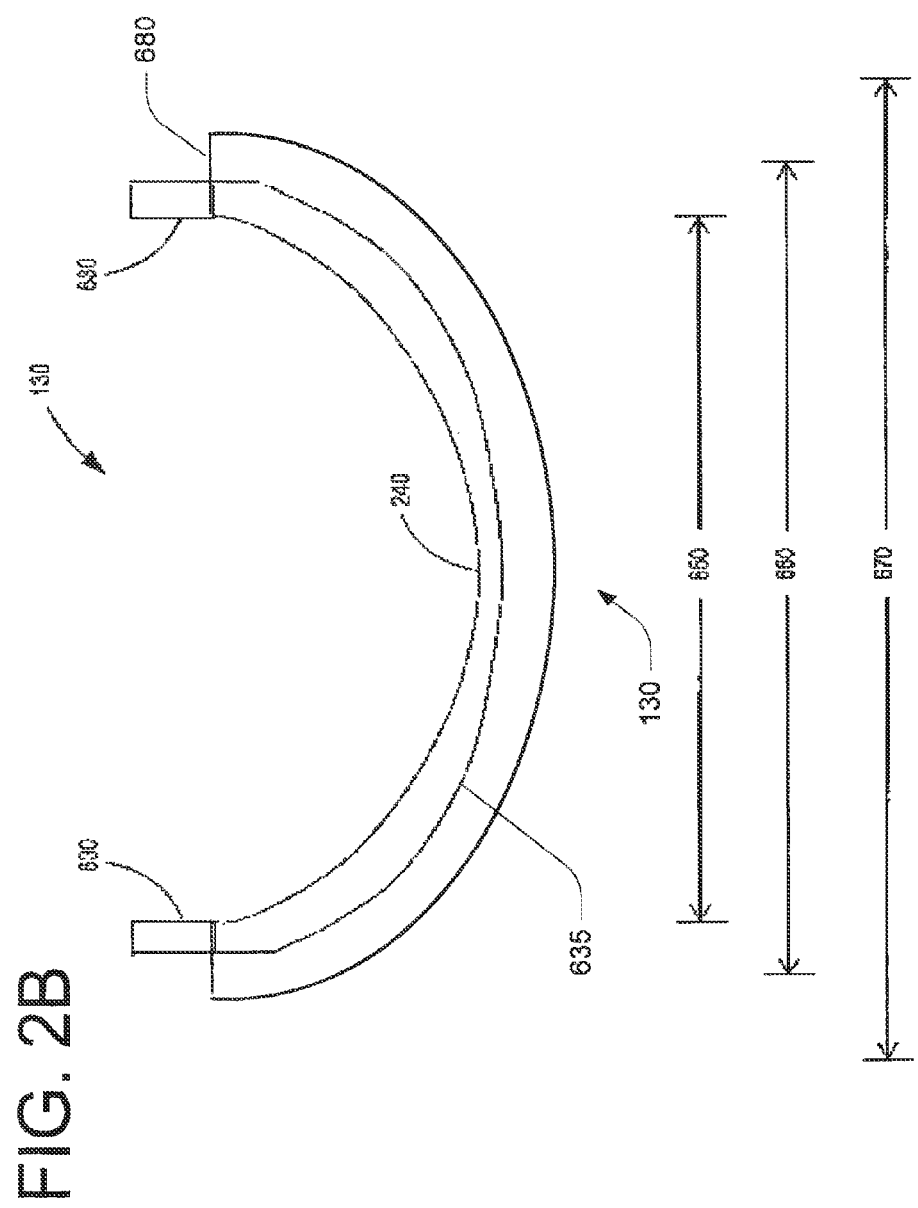

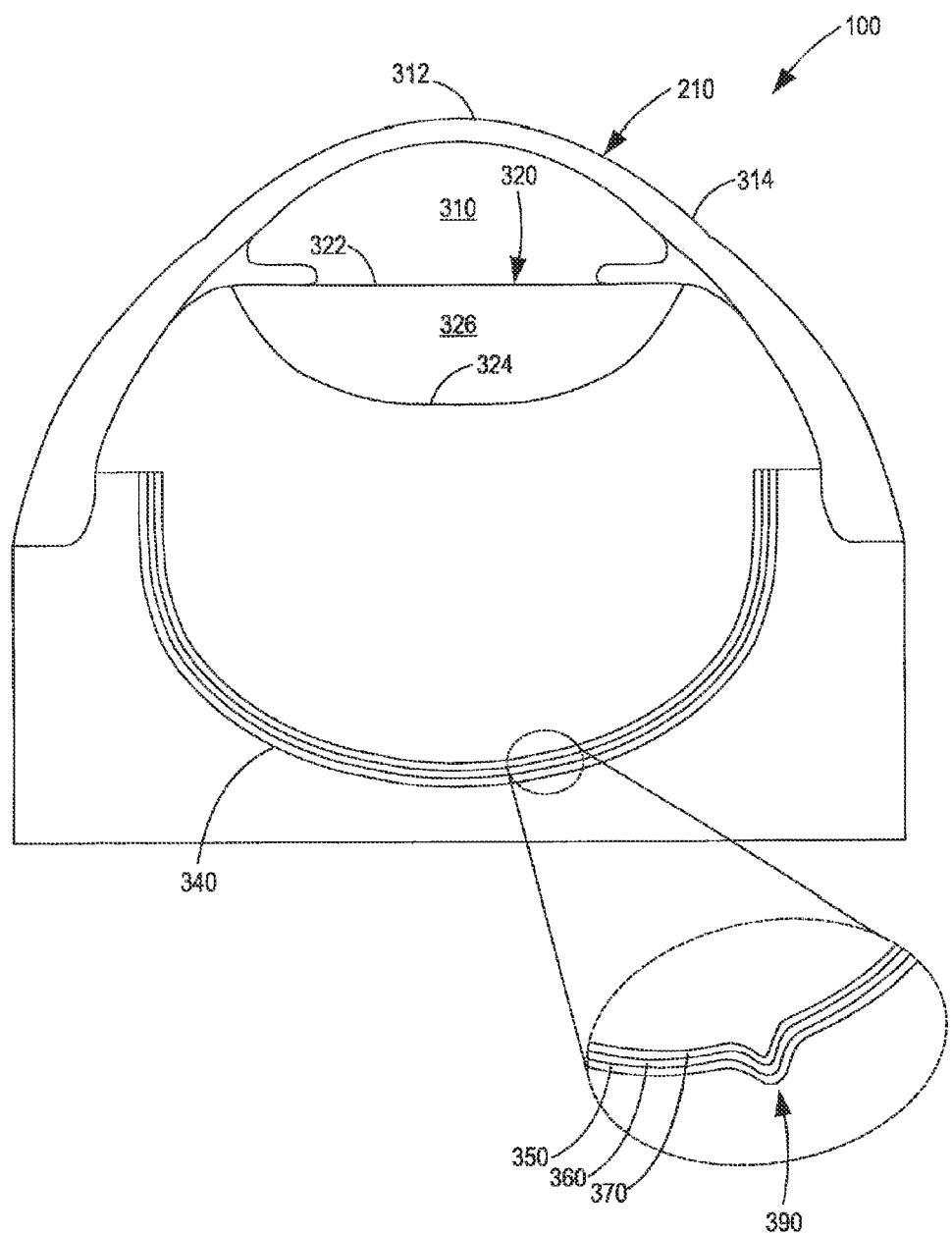

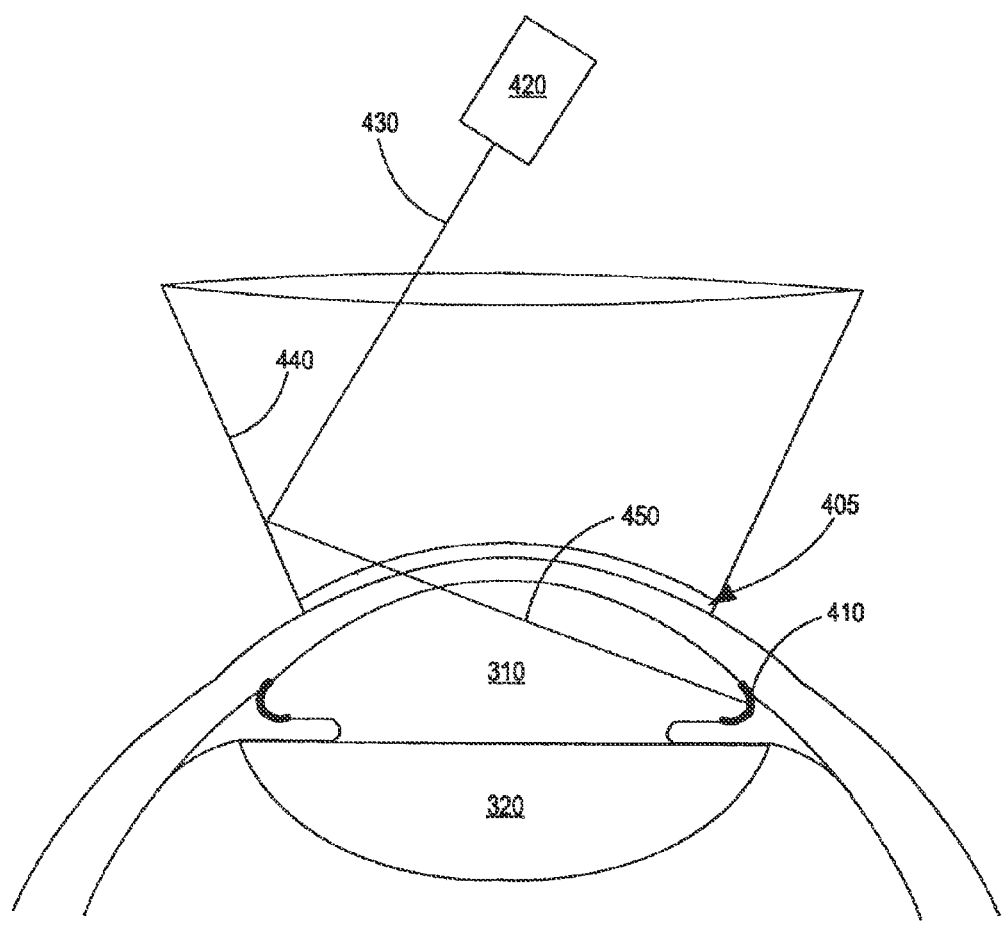

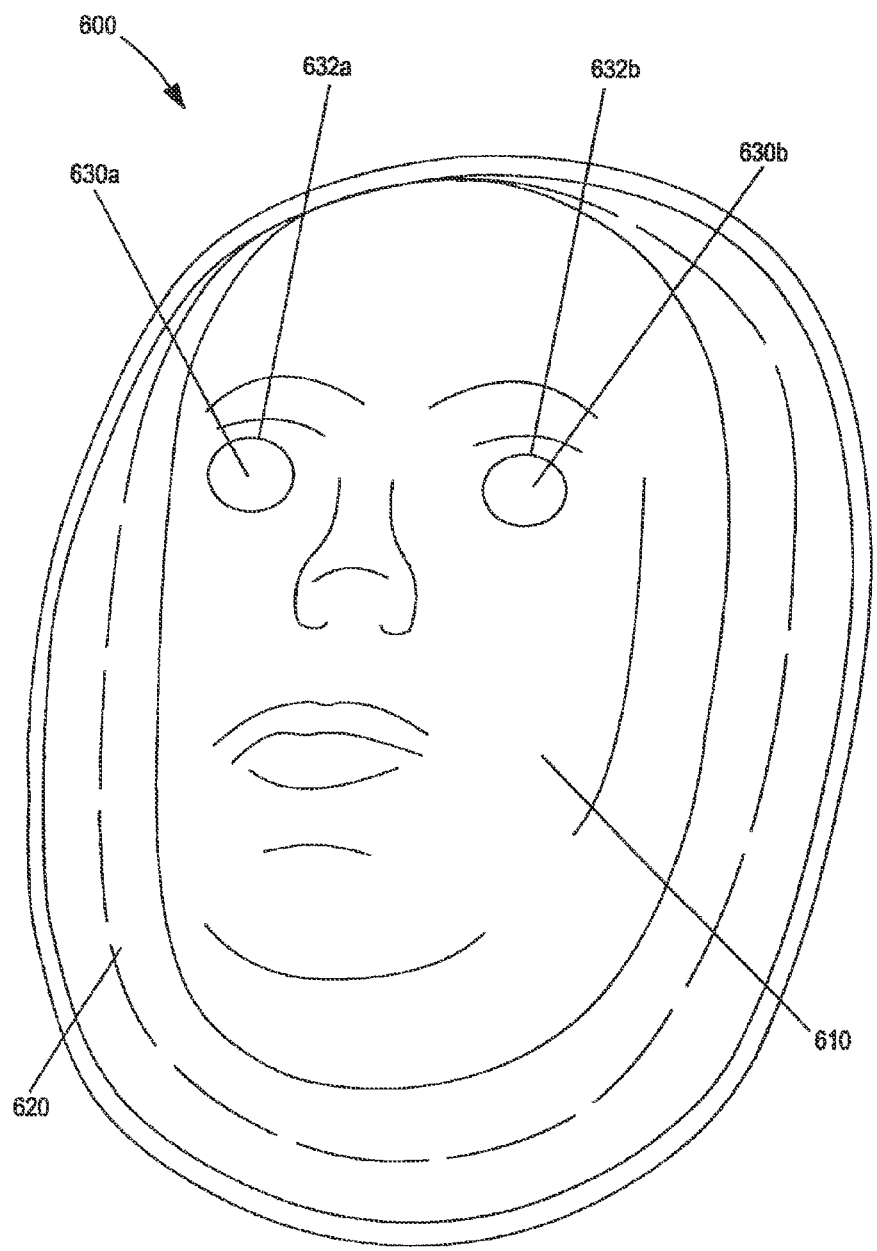

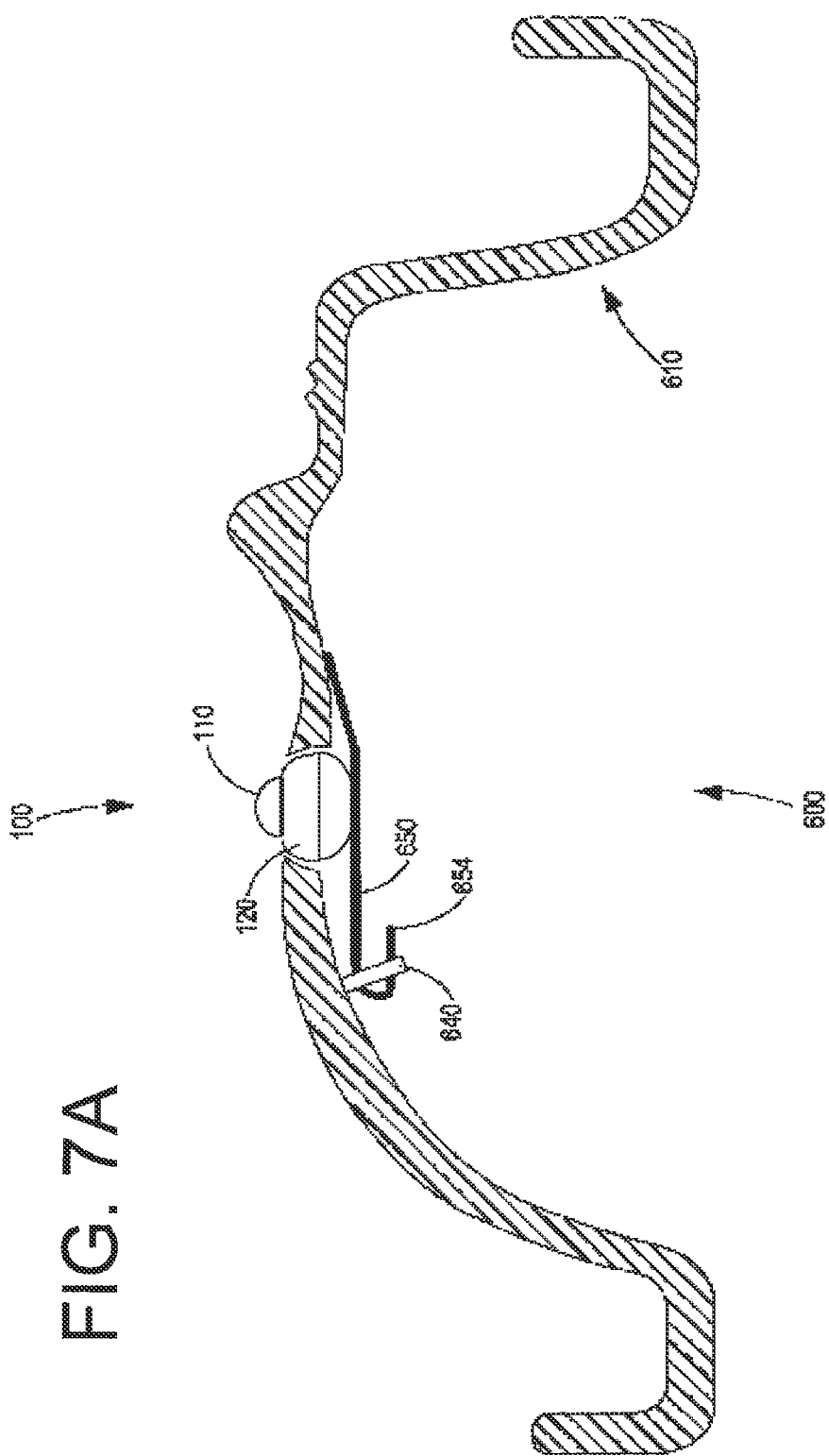

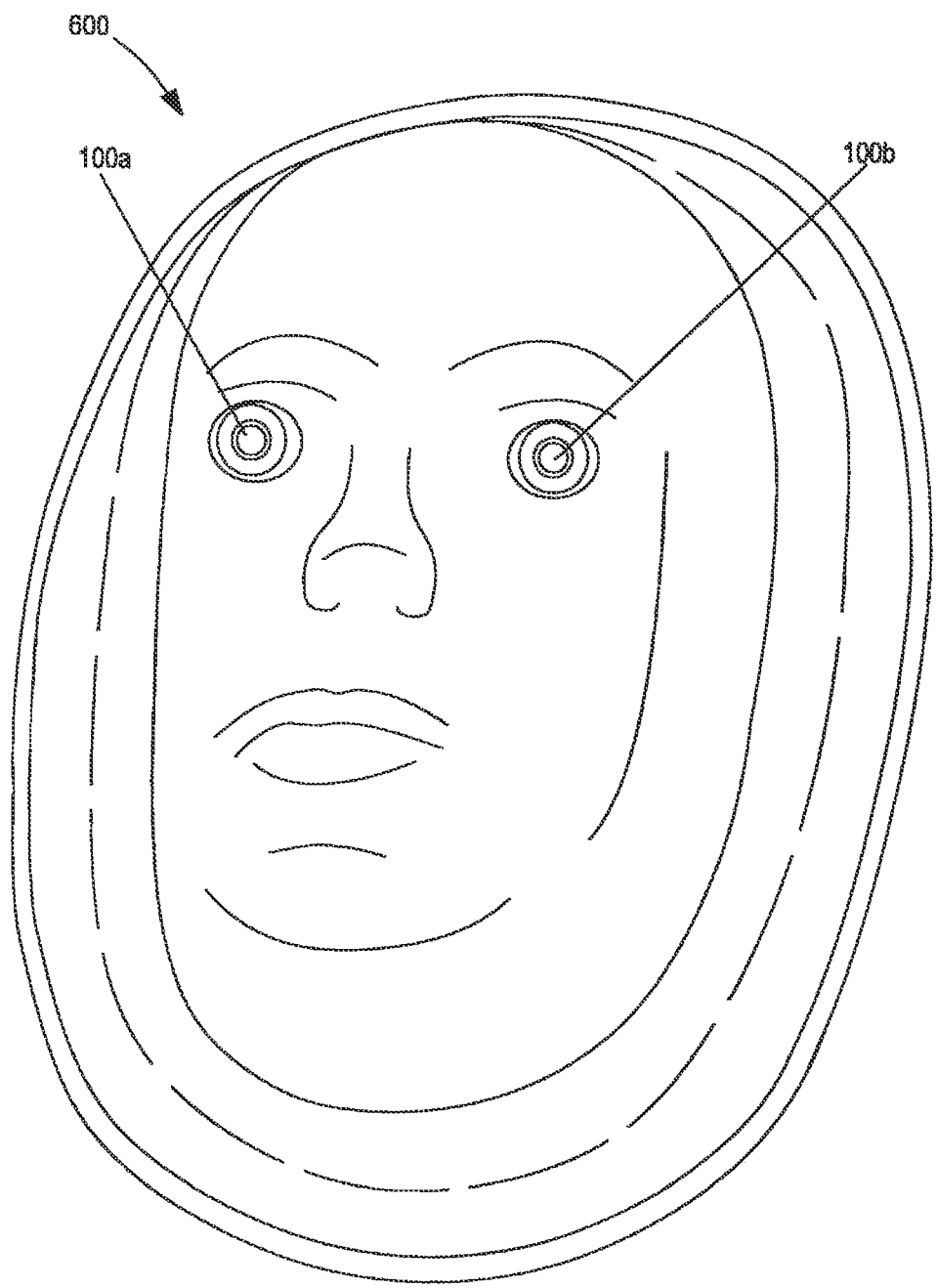

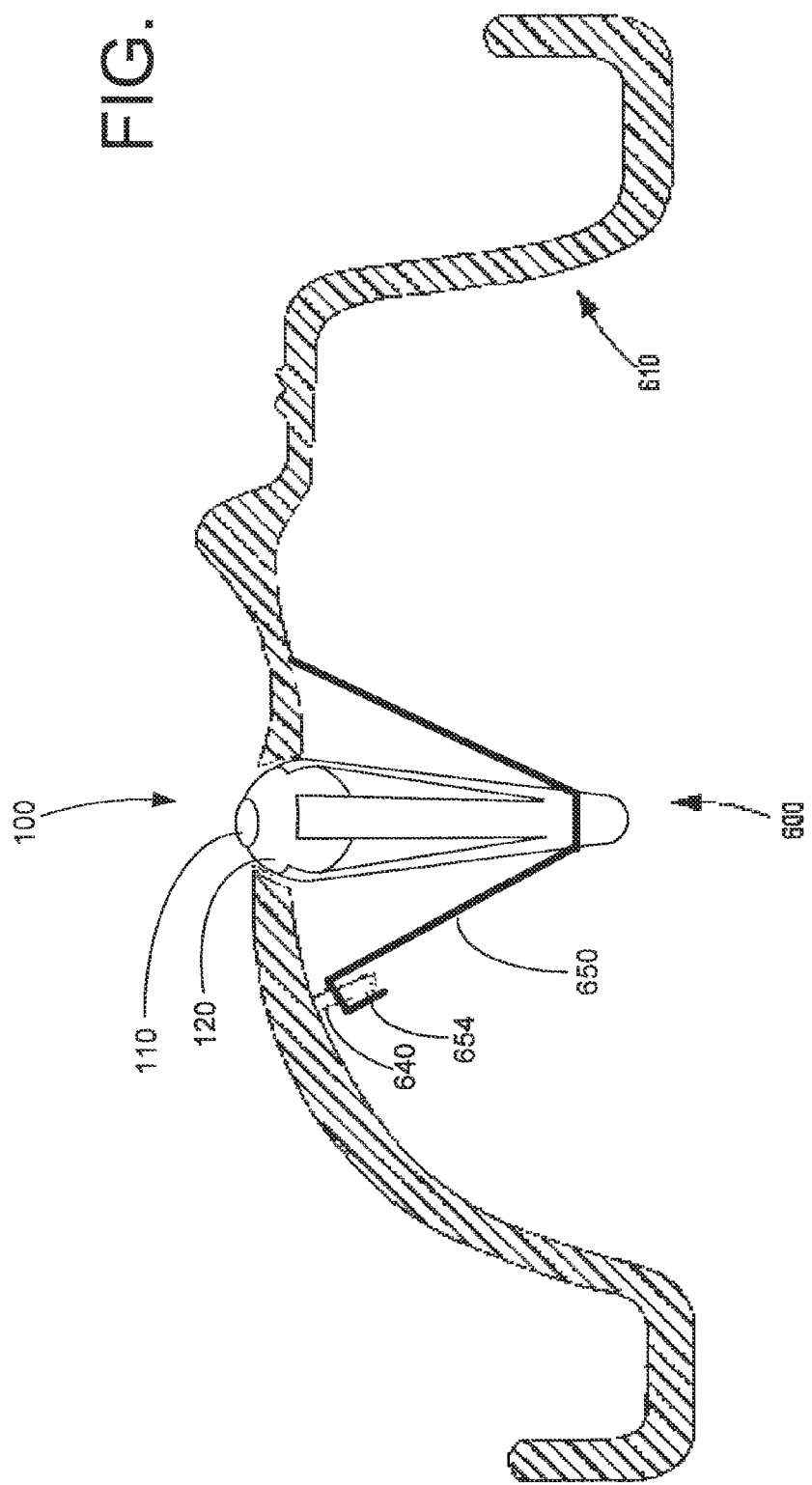

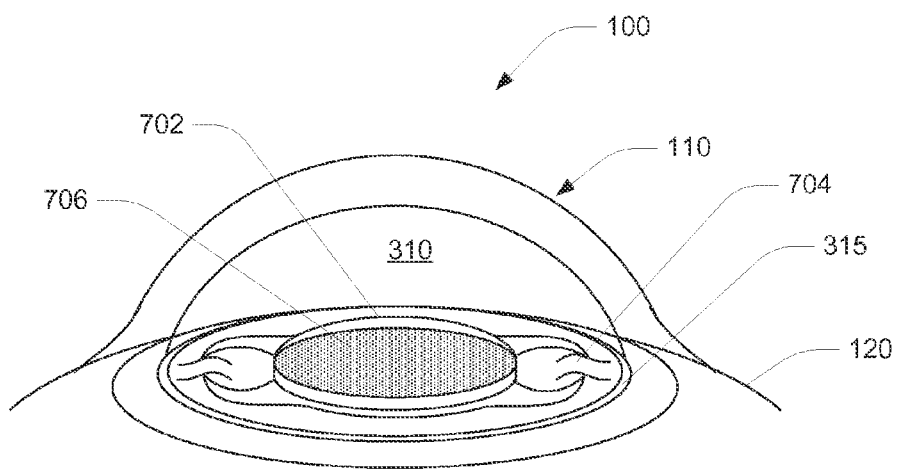
FIG.
10B

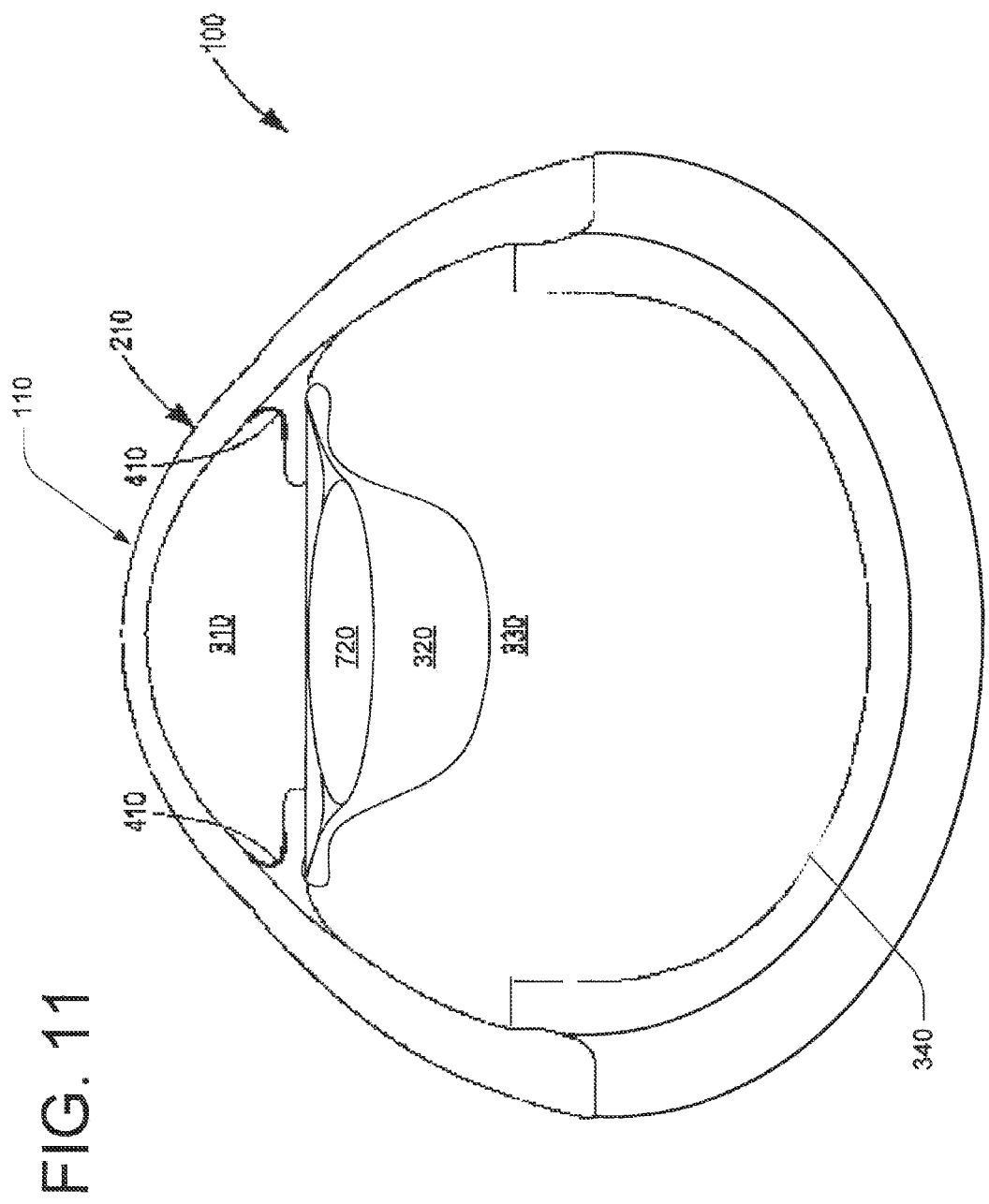

MODEL HUMAN EYE AND FACE MANIKIN FOR USE THEREWITH

CROSS REFERENCE TO RELATED APPLICATIONS

This Application claims priority from a U.S. Provisional Patent Application having Ser. No. 61/367,335 filed on Jul. 23, 2010, which is incorporated by reference herein.

FIELD OF THE INVENTION

This invention relates to a model human eye for pedagogical use by medical professionals.

BACKGROUND OF THE INVENTION

Medical students, interns, residents, and fellows, specializing in diagnosing and treating injuries to, and the diseases of, the eye must necessarily practice certain surgical techniques on various models of the human eye prior to actually operating on human patients. Prior art training methods often use animal eyes, such as, for example human cadaver eyes or cow eyes.

The use of human cadaver and/or animal eyes (collectively "biological eyes") is burdened with many procedural issues. The biological eyes must be refrigerated before use, and even when refrigerated suffer from a short "shelf life" due to inevitable biological decomposition. The handling of such biological eyes requires compliance with, among other regulations, the Blood Born Pathogens Standard promulgated under the federal Occupational Health and Safety Act. After use, the biological eyes must be properly disposed of.

What is needed is a model human eye that closely mimics the anatomy and physiology of the human eye, but which does not require refrigeration and other special handling procedures.

SUMMARY OF THE INVENTION

Applicants' invention comprises a model human eye that is structurally suited for practicing surgical techniques, including extraocular muscle resection and recession. The model eye comprises a hemi-spherical-shaped bottom portion comprising a bowl-shaped substrate disposed therein, and a plurality of retinal layers stacked on the surface of that bowl-shaped substrate. The model eye further comprises an integrally molded, hemispherical-shaped top portion comprising a visually transparent cornea portion and a visually opaque sclera portion comprising an inner surface, an annular iris continuously attached to the inner surface and extending inwardly therefrom, and a lenticular bag continuously attached to the iris, wherein the iris in combination with the lenticular bag and the cornea portion define an anterior chamber The top portion is attached to the base portion to define a posterior chamber. The model eye further comprises a first fluid disposed in the anterior chamber, wherein said first fluid comprises a first viscosity, and a second fluid disposed in the posterior chamber, wherein that second fluid comprises a second viscosity, wherein the second viscosity is greater than the first viscosity.

The model eye further includes a cylindrical member that extends outwardly from the sclera portion and substantially mimics an optic nerve. Attached to the distal end of the cylindrical member is a cone-shaped elastomeric assembly having four elastomeric members extending outwardly therefrom. The distal ends of each of the elastomeric members are attached to the sclera portion.

Applicants' invention further comprises a face manikin formed to mimic a human-face comprising a raised, face-mimicking structure surrounded by a trough, wherein the face-mimicking structure comprises two eye sockets extending therethrough, an exterior surface, and an interior surface, two attachment straps wherein each attachment strap comprises a first end attached to said interior surface adjacent one of the eye sockets, two attachment buckles wherein each attachment buckle attached to said interior surface adjacent one of the eye sockets. The exterior surface of the face-mimicking structure comprises an eye brow element disposed adjacent a first side of each eye socket, a nose feature disposed between the eye sockets and adjacent a second and opposing side of the eye sockets, and a mouth feature disposed adjacent the nose feature.

One or two model eyes can be releasably disposed in the face manikin such that a cornea portion extends outwardly through an eye socket. Various surgical procedures can be practiced using one or both of the model eyes. The used model eyes can then be removed from the face manikin, and those used model eyes can be retained for study or discarded. New model eyes can be disposed in the face manikin and the surgical procedure practiced a plurality of times.

BRIEF DESCRIPTION OF THE DRAWINGS

The invention will be better understood from a reading of the following detailed description taken in conjunction with the drawings in which like reference designators are used to designate like elements, and in which:

FIG. 2B is a cross-sectional view of a second subassembly used to form Applicants' model eye;

FIG. 3E is a cross-sectional view of Applicants' model showing the three retinal layers of FIG. 3D formed to comprise a dimple in the vicinity of the macula;

FIG. 4C illustrates a laser treatment for glaucoma using Applicants' model eye;

FIG. 6B is a perspective view of the face manikin of FIG. 6A;

FIG. 7A shows the face manikin of FIG. 6A with a model human eye removeably affixed thereto;

FIG. 7B is a perspective view of the face manikin of FIG. 6A with two model human eyes removeably affixed thereto;

FIG. 7C shows the face manikin of FIG. 6A with a model human eye removeably affixed thereto;

FIG. 10B is a top view of Applicants' model eye presented in FIG. 10A; and

FIG. 11 is an embodiment of Applicants' model eye having a distended lenticular bag to mimic the structure of the lenticular bag in an aging patient.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a model human eye that closely mimics the anatomy, physiology, and dimensions, of the human eye. Moreover, Applicants' invention is structurally suited for physicians to practice surgical procedures utilizing their own equipment and instruments, meaning that training methods utilizing Applicants' model human eye closely mimic surgical procedures performed on actual patients.

Figure 1A:
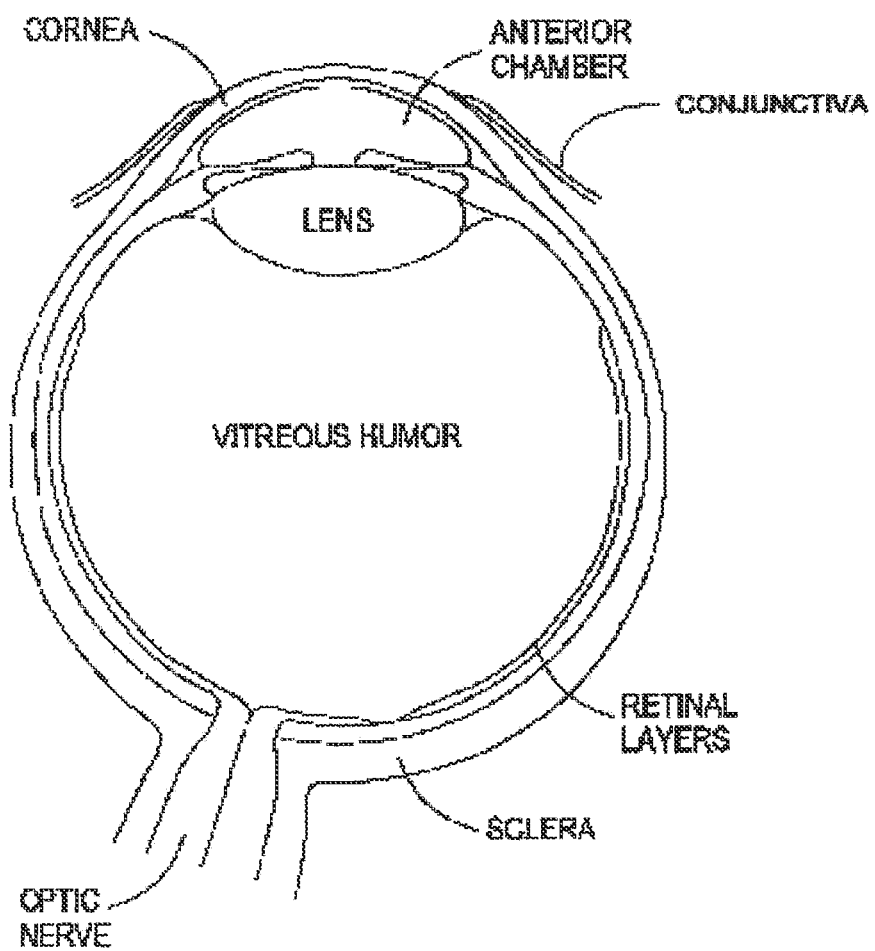
FIG. 1A illustrates a human eye.
Figure 1B:
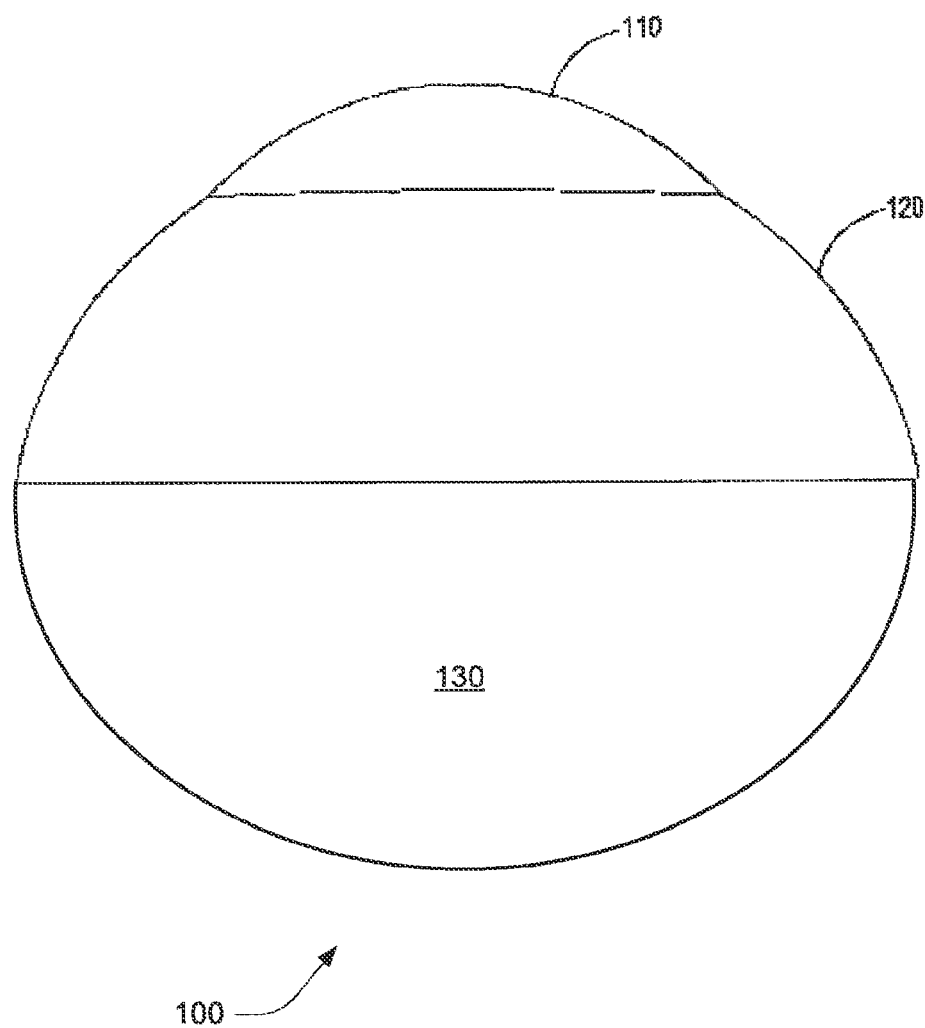
FIG. 1B is a side view of Applicants' model eye.

Referring now to FIG. 1A, the human eye comprises outer layers which include the cornea and the sclera. These layers enclose an anterior chamber disposed in front of the lens, and a larger posterior chamber disposed behind the lens. The anterior chamber is filled with a watery aqueous humor, and the posterior chamber is filled with a jelly-like vitreous body. Referring now to FIG. 1B, Applicants' model human eye 100 comprises a cornea portion 110, a sclera portion 120, and a base 130.

Figure 2A:
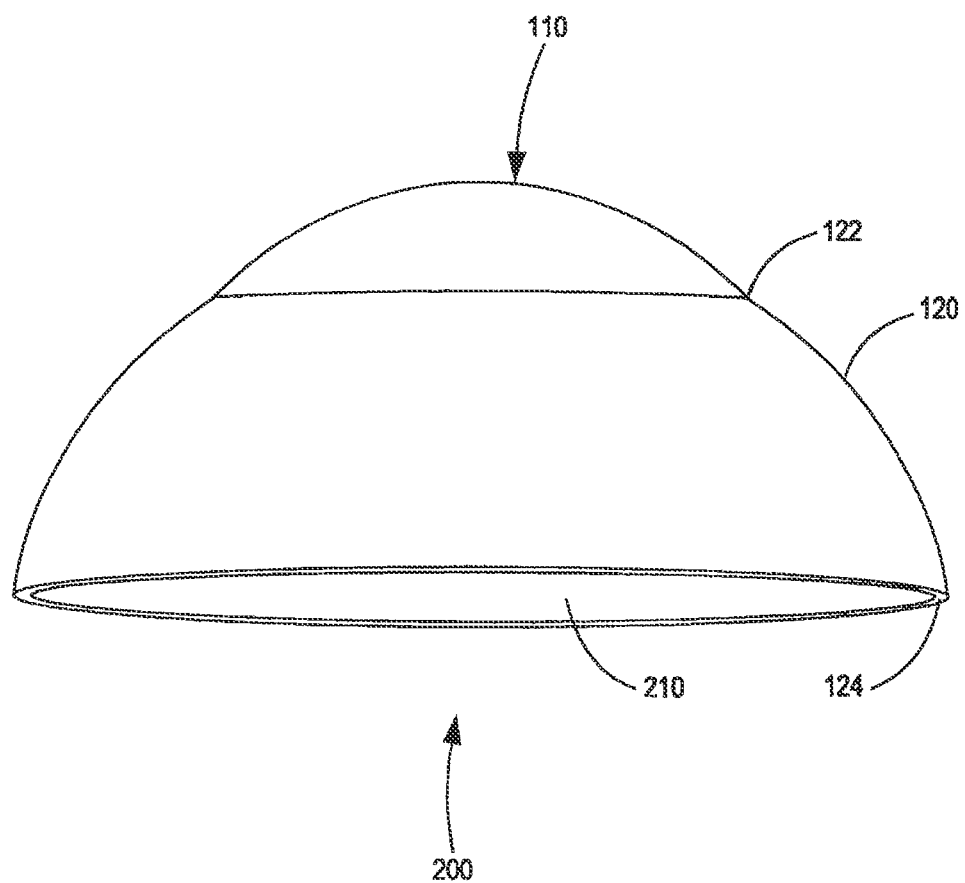
FIG. 2A is a perspective view of a first subassembly used to form Applicants' model eye.

Referring now to FIGS. 2A and 2B, Applicants' model human eye is formed from subassembly 200 and base 130. Subassembly 200 comprises cornea portion 110 and sclera portion 120. Subassembly 200 comprises an extended hemispherical-shaped assembly having an open end 210, wherein that open end 210 is defined by continuous distal end 124. Open end 210 is disposed around annular ring 260, and distal end 124 is attached to attachment plateau 680.

In certain embodiments, subassembly 200 is molded as an integral part. In certain embodiments, subassembly 200 is formed by liquid injection molding. In certain embodiments, assembly is formed by injection molding a silicone resin. In certain embodiments, that silicone resin comprises polydimethylsiloxane. In certain embodiments, that silicone resin comprises an elastomeric polydimethylsiloxane.

In certain embodiments, the portion of the mold used to form sclera portion 120 comprises a plurality of microscopic protuberances, i.e. a relatively "rough" surface microscopically. As a result, the molded sclera portion 120 diffracts visible light, and therefore, is visually opaque to the human eye. In contrast, the portion of the mold used to mold cornea portion 110 does not comprise such microscopic roughness. As a result, cornea portion 110 comprises a smooth surface and does not diffract visible light, and is visually transparent to the human eye.

FIG. 2B shows a perspective view of base 130. In certain embodiments, base 130 is formed using an acrylonitrile butadiene styrene terpolymer. In the illustrated embodiment of FIG. 2B, base 130 comprises a bowl-shaped, internal space defined by curved surface 240.

As depicted in the illustrated embodiment of FIG. 2B, in certain embodiments base 130 comprises a circular bottom 635 in combination with circular wall 630 continuously attached to bottom 635 and extending upwardly therefrom.

Base 130 comprises outer diameter 670. In certain embodiments, diameter 670 is between about 22 mm and about 24 mm. In certain embodiments, diameter 670 is 23 mm. In certain embodiments, diameter 660 is between about 20 mm and about 22 mm. In certain embodiments, diameter 660 is 21 mm. In certain embodiments, diameter 650 is between about 18 mm and about 20 mm. In certain embodiments, diameter 650 is 19 mm.

Figure 3A:
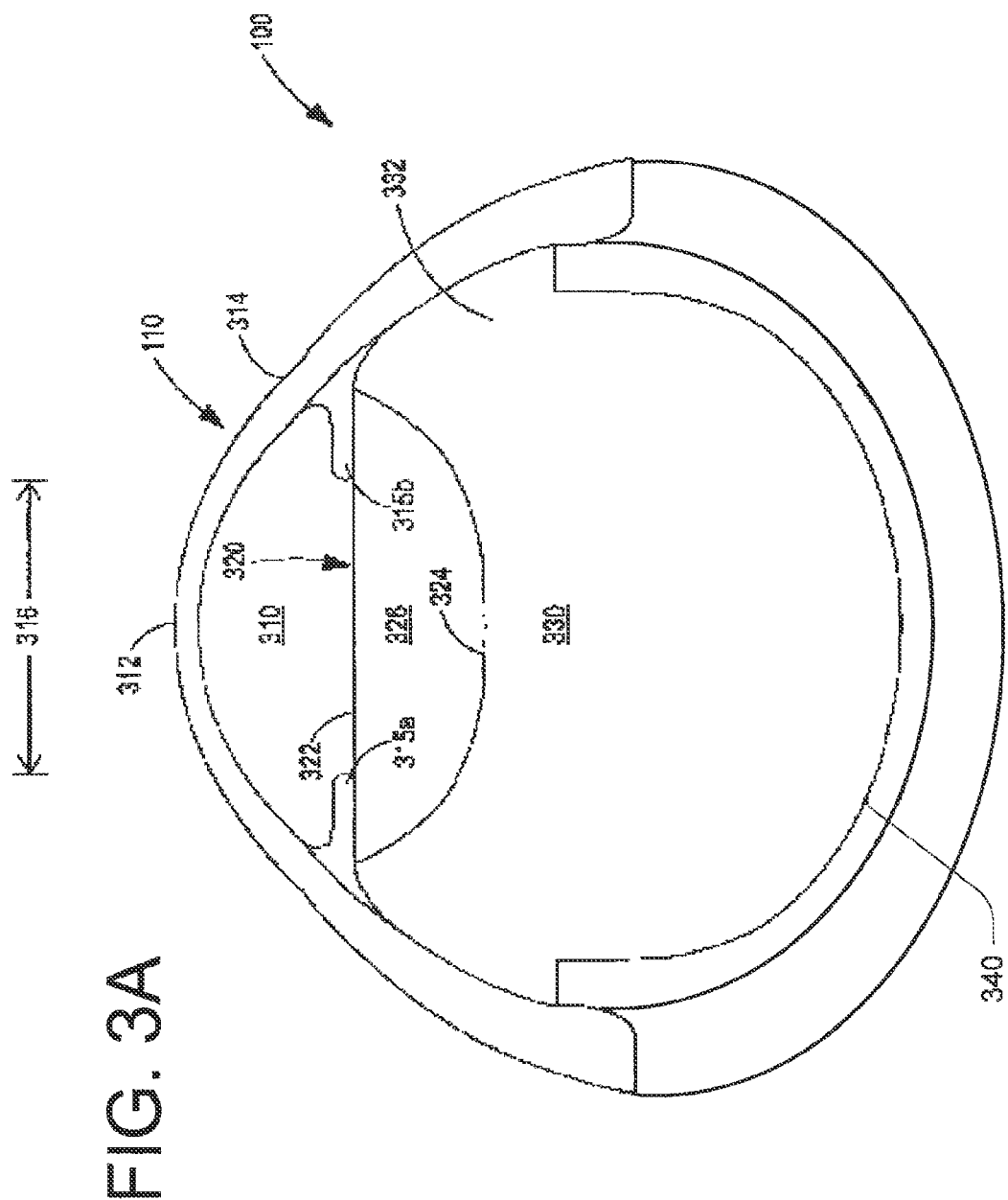
FIG. 3A is a first cross-sectional view of Applicants' model eye.

Referring now to FIG. 3A, a human cornea comprises a varying thickness, wherein that thickness is greatest at the periphery and decreases to a minimum thickness in the middle. Cornea portion 110 is formed to mimic the varying thickness of the human cornea. Cornea portion 110 comprises center point 312. Cornea portion 110 is formed to comprise a minimum thickness between about 0.45 mm and about 0.55 mm at center point 312. Cornea portion 110 is formed to comprise a maximum thickness of between about 0.6 mm and about 0.8 mm at periphery 314 of cornea portion 110.

Applicants' model human eye 100 further comprises iris 315 and a lenticular bag 320 disposed therein. FIG. 3A shows iris portion 315a and iris portion 315b. As those skilled in the art will appreciate, iris portions 315a and 315b are each part of a continuous, circular, iris element. In certain embodiments the distal ends of iris portions 315a and 315b are separated by a distance 316. Distance 316 can be varied. In certain embodiments, distance 316 is 8 mm.

In the illustrated embodiment of FIG. 3A, Applicants lenticular bag 320 comprises anterior capsular membrane 322 and posterior capsular membrane 324. In certain embodiments, anterior capsular membrane 322 is formed from Mylar "A". In certain embodiments, anterior capsular membrane 322 comprises a thickness of about 0.01 mm.

In certain embodiments posterior capsular membrane 324 comprises a hemi-spherical shape. In certain embodiments, posterior capsular membrane comprises a parabolic shape. In certain embodiments, posterior capsular membrane 324 is formed from glycol-modified polyethylene terephthalate. In certain embodiments, posterior capsular membrane 324 comprises a thickness of about 0.25 mm.

Lenticular bag 320 is filled with fluid 326. Fluid 326 is adjusted such that lenticular bag 320 mimics the physical attributes of a human lens. In certain embodiments, fluid 326 comprises an aqueous solution comprising gelatin. In certain embodiments, fluid 326 comprises gelatin, agar, propylene glycol, water, and a preservative. In certain embodiments, fluid 326 further comprises a colorant. In certain embodiments, that colorant comprises a yellow tint. In certain embodiments, that colorant comprises a gray tint. In certain embodiments, the colorant is selected such that lenticular bag 320 mimics a lens found in an elderly human patient.

Figure 3B:
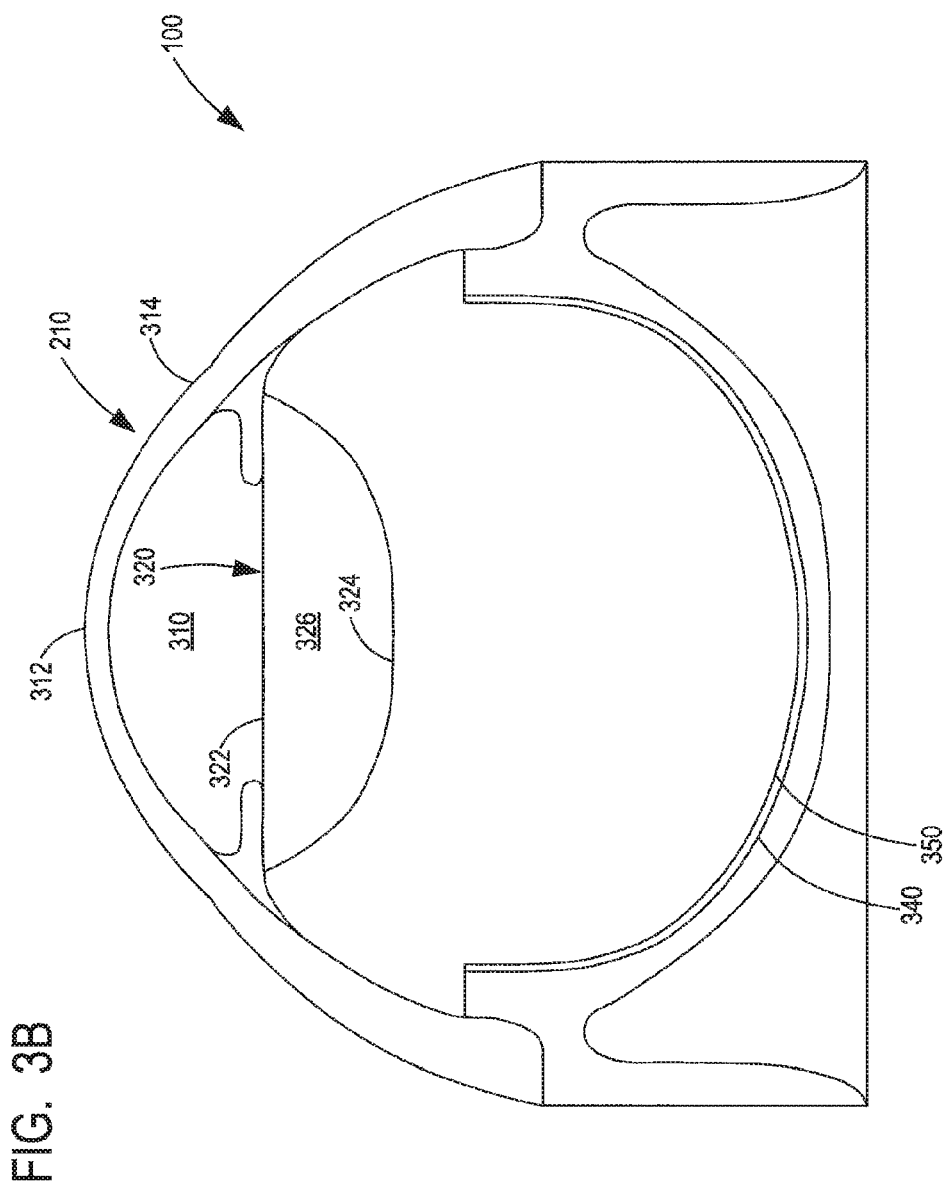
FIG. 3B is a second cross-sectional view of Applicants' model eye showing one retinal layer.
Figure 3C:
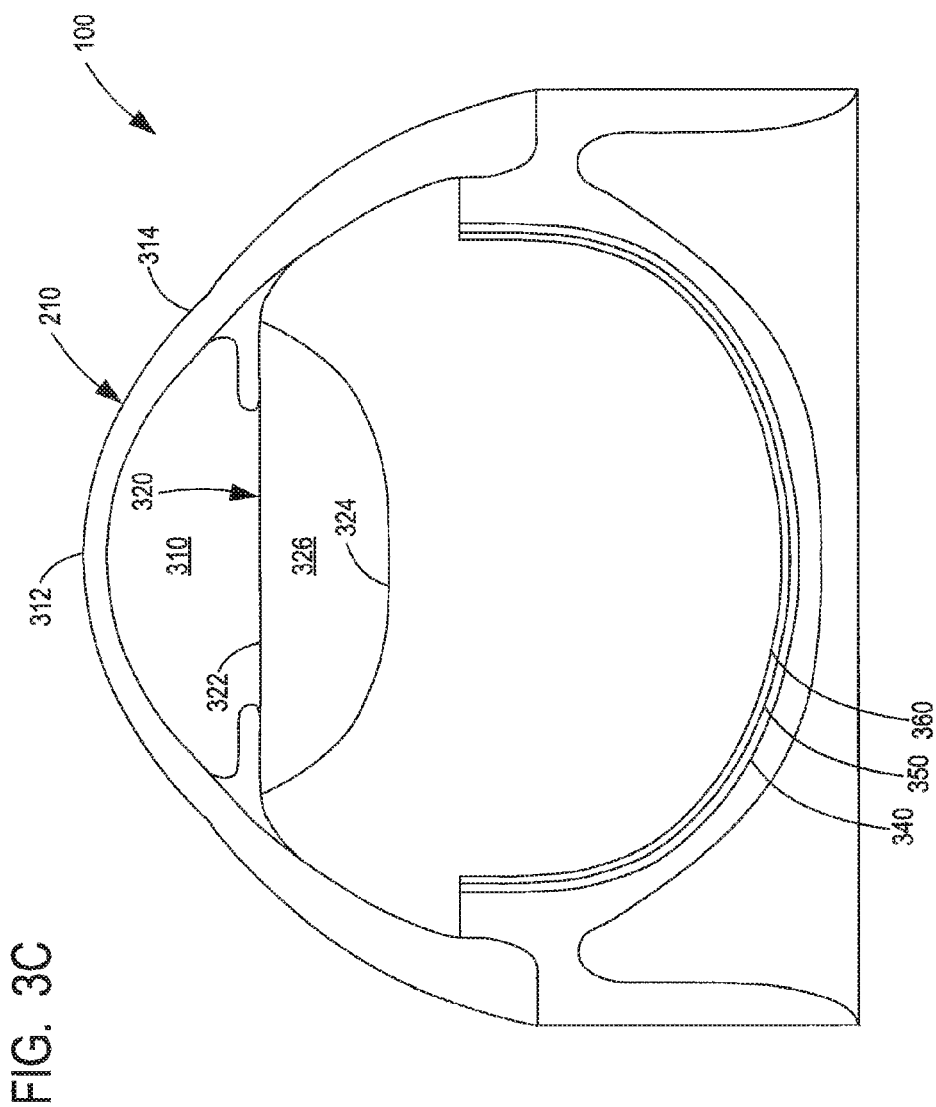
FIG. 3C is a third cross-sectional view of Applicants' model eye showing two retinal layers.
Figure 3D:
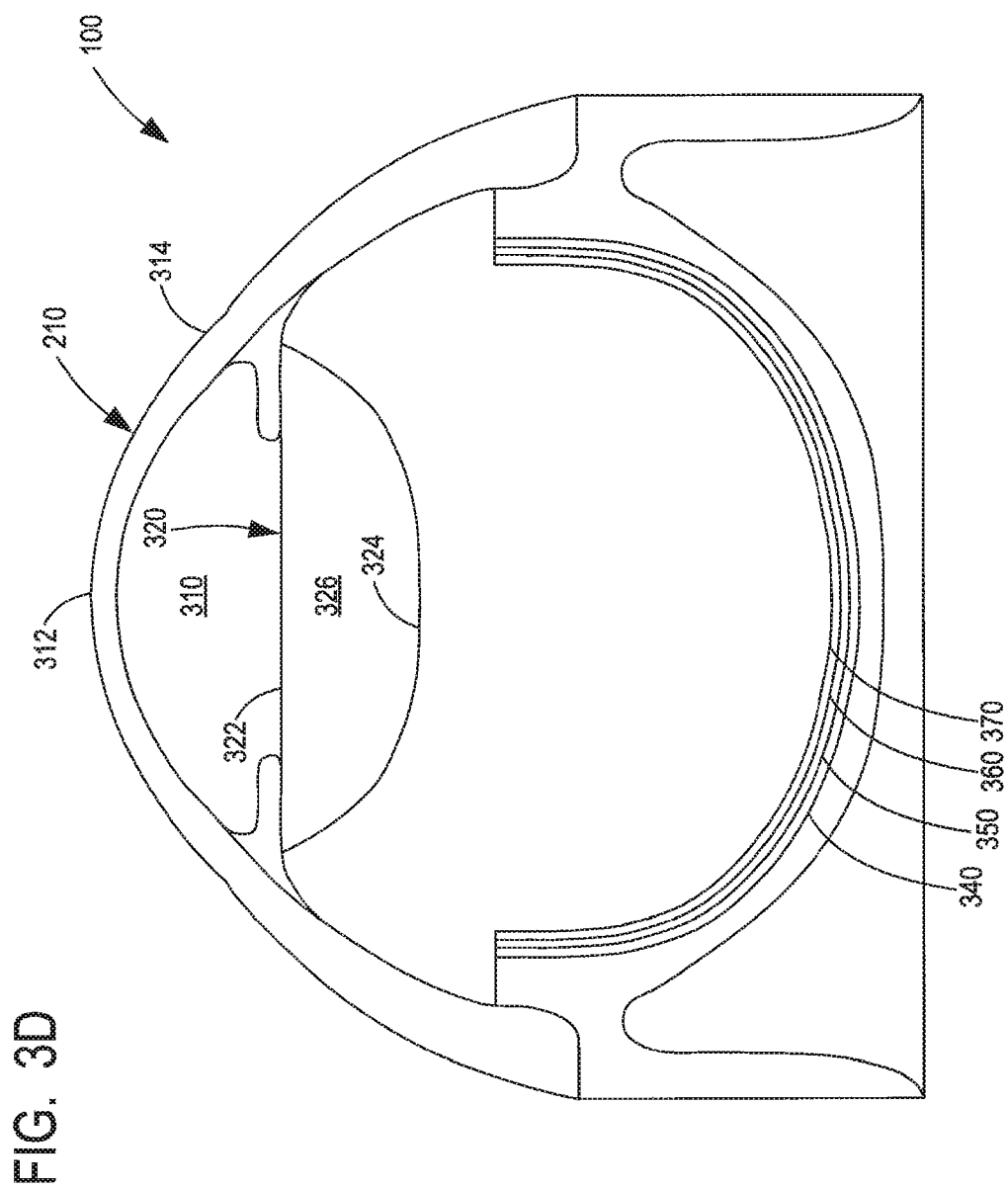
FIG. 3D is a fourth cross-sectional view of Applicants' model eye showing three retinal layers.
Figure 3F:
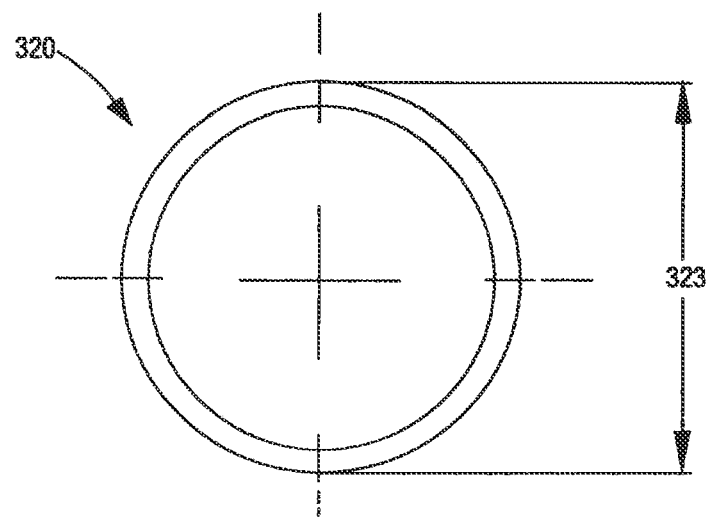
FIG. 3F is a top view of Applicants' lenticular bag.
Figure 3G:
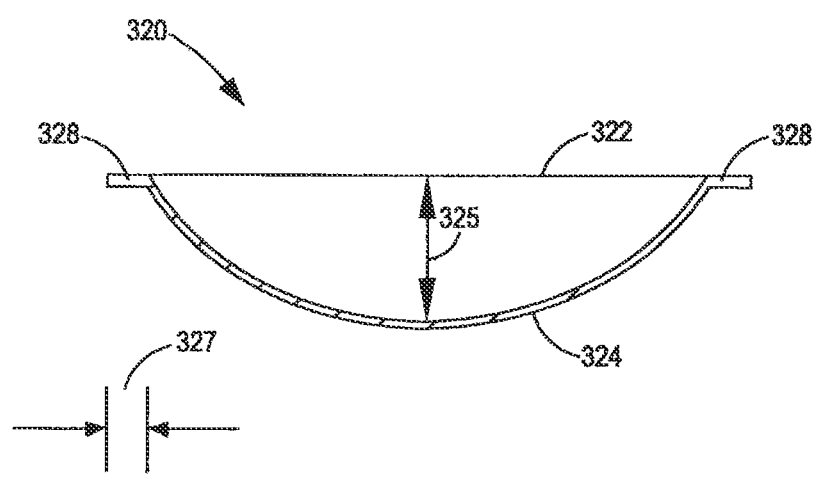
FIG. 3G is a side view of Applicants' lenticular bag.

Referring now to FIGS. 3F and 3G, anterior capsular membrane 322 of lenticular bag 320 comprises a circular surface area, wherein that circular surface comprises a diameter 323. In certain embodiments, diameter 323 is about 12.5 mm. Rim element 328 comprises a width 327. In certain embodiments, width 327 is about 0.7 mm Posterior capsular membrane 324 is attached to anterior capsular membrane 322 adjacent and inwardly of rim 328. Posterior capsular membrane 324 is disposed a maximum distance 325 from anterior capsular membrane 322. In certain embodiments, distance 325 is about 3 mm. In other embodiments, distance 325 is between 4 mm and 5 mm to simulate the anatomy of older patients.

Filled lenticular bag 320 mimics the capsule surrounding the lens in the human eye. In a normal human eye, the lens is surrounded by a capsule which separates the lens from the vitreous humor, which is a thick fluid disposed in chamber 330 located in the back of the eye, and the aqueous humor, which is a lower viscosity fluid disposed in anterior chamber 310 located in the front of the eye.

Applicants' model human eye 100 comprises a first fluid 312 disposed in anterior chamber 310. First fluid 312 comprises a first viscosity. In certain embodiments, fluid 312 comprises normal saline. Applicants' model human eye 100 further comprises a second fluid 332 disposed in posterior chamber 330. Second fluid 332 comprises a second viscosity, wherein the second viscosity is greater than the first viscosity. Fluid 332 comprises substantially the same viscosity as does the vitreous humor found in a human eye.

Applicants' model eye can be used to practice suturing the cornea wherein the surgeon must "bury the sutures." Applicants' model eye can be used to practice suturing corneal/scleral lacerations.

In addition, Applicants' model human eye 100 can be used to practice an anterior capsulotomy and cataract removal. An anterior capsulotomy is a cataract surgery technique used to make a small round opening in the front of the capsule that contains the eye's natural crystalline lens. Through this opening, the ophthalmologist inserts a tiny instrument to break up and remove the cloudy lens. It is then replaced with a plastic prescription lens, i.e. an IntraOcular Lens or "IOL".

A full corneal transplant, also known as a corneal graft, or as a penetrating keratoplasty, involves the removal of the central portion (called a button) of a diseased cornea and replacing it with a matched donor button of cornea. Corneal grafts are performed on patients with damaged or scarred corneas that prevent acceptable vision. This may be due to corneal scarring from disease or trauma.

Two model eyes can be used to practice corneal grafts. A first model human eye 100 is used as the "donor." A corneal button is obtained from this first model eye. That corneal button is then sutured in place on a second model human eye 100.

Applicants' model human eye 100 may be used to practice Phacoemulsification. To practice the Phacoemulsification procedure, a very small incision of about 3.2 mm or less is made into cornea portion 110. The capsular material comprising the lenticular bag is then opened in a procedure called a capsulotomy. Thereafter, the gelatinous material disposed in lenticular bag 320 is converted into a soft pulp using high frequency sound waves. That pulp-material is then sucked out. Subsequently, a foldable lens IOL is injected through the small incision and positioned into the lenticular bag 320.

Referring now to FIGS. 1A, 3A, and 3D, the human eye comprises a plurality of retinal layers disposed along the posterior interior surface. Applicants' model human eye 100 similarly comprises a plurality of layers, namely layers 350, 360, and 370, disposed in a stack disposed on the curved surface 340 of posterior chamber 330. In certain embodiments, layer 370 comprises a blue color. In certain embodiments, layer 360 comprises a white color. In certain embodiments, layer 350 comprises a red color. In certain embodiments, each layer 350, 360, and 370, are separately formed. In certain embodiments, layers 350, 360, and 370, comprise a thickness between about 0.0002 to about 0.0006 inches.

Referring now to FIGS. 3A and 3B, Applicant utilizes a process wherein a sprayable RTV silicone formulation in combination with a suitable catalyst is sprayed against the curved surface 340 of the posterior chamber 330 to form first retinal layer 350 having a thickness between about 0.0002 to about 0.0006 inches. In certain embodiments, layer 350 was formed using Dow Corning 3110 RTV Silicone Rubber with either Dow Corning RTV Catalyst #4 for fast sets or Catalyst #1 for slower setting.

Referring now to FIGS. 3B and 3C, after first retinal layer 350 was completely cured, Applicant sprayed a RTV silicone formulation in combination with a suitable catalyst onto first retinal layer 350 to form second retinal layer 360 having a thickness between about 0.0002 to about 0.0006 inches. In certain embodiments, second retinal layer 360 was formed using Dow Corning 3110 RTV Silicone Rubber with either Dow Corning RTV Catalyst #4 for fast sets or Catalyst #1 for slower setting.

Referring now to FIGS. 3C and 3D, after second retinal layer 360 was completely cured, Applicant sprayed a RTV silicone formulation in combination with a suitable catalyst onto second retinal layer 360 to form third retinal layer 370 having a thickness between about 0.0002 to about 0.0006 inches. In certain embodiments, second retinal layer 370 was formed using Dow Corning 3110 RTV Silicone Rubber with either Dow Corning RTV Catalyst #4 for fast sets or Catalyst #1 for slower setting.

Layer 370 corresponds to an Epi-retinal membrane ("ERM"), sometimes referred to as a "macular pucker." ERM comprises a cellophane-like membrane that forms over the macula. ERM represents a slow-progressing problem that affects the central vision by causing blur and distortion. As it progresses, the traction of the membrane on the macula may cause swelling.

ERM is seen most often in people over 75 years of age. It usually occurs for unknown reasons, but may be associated with certain eye problems such as: diabetic retinopathy, posterior vitreous detachment, retinal detachment, trauma, and the like.

A procedure called a membrane peel is performed when vision has deteriorated to the point that it is impairing the patient's lifestyle. Most vitreo-retinal surgeons recommend waiting for treatment until vision has decreased to the point that the risk of the procedure justifies the improvement. The membrane peel is performed under a local anesthesia in an operating room. The membrane peel is often done in conjunction with a procedure called a vitrectomy.

After making tiny incisions, the ERM membrane is removed by suction. Such an ERM membrane peel operation can be practiced using Applicants' model human eye 100. A successful ERM peel is evidenced by removal of the blue layer 370 with no removal of the underlying white layer 360.

White colored layer 360 corresponds to the internal limiting membrane. The inner limiting membrane separates the retina from the vitreous fluid disposed in the posterior chamber 330.

Red-colored layer 350 corresponds to a choroidal neovascular membrane ("CNVM"). The development of a CNVM is practically synonymous with the term "wet" age related macular degeneration (AMD). However, CNVM does occur with other disorders, such as presumed ocular histoplasmosis (POH), pseudoxanthoma elasticum, Paget's disease, myopic retinal degeneration, and other less common disorders. A CNVM is ultimately the result of a break in a structural layer beneath the retina known as Bruch's membrane, which separates the nourishing vascular layer called the choroid from the retina. A break in Bruch's membrane may allow the ingrowth of vessels from the choroid to a position just beneath the retina. These vessels may then leak fluid or blood, initially distorting or blurring vision, and may eventually lead to scarring in the macula and severe loss of central vision. Applicants' model human eye 100 can be used to practice surgical treatment of a CNVM.

Referring to FIG. 3E, in certain embodiments curved surface 340 is formed to include a dimple 390 extending inwardly therein to mimic the macula. As those skilled in the art will appreciate, the macula is located on the temporal side of the optic nerve. In the illustrated embodiment of FIG. 3E, layers 350, 360, and 370, also comprise a dimple feature in the vicinity of the macula.

Figure 4A:
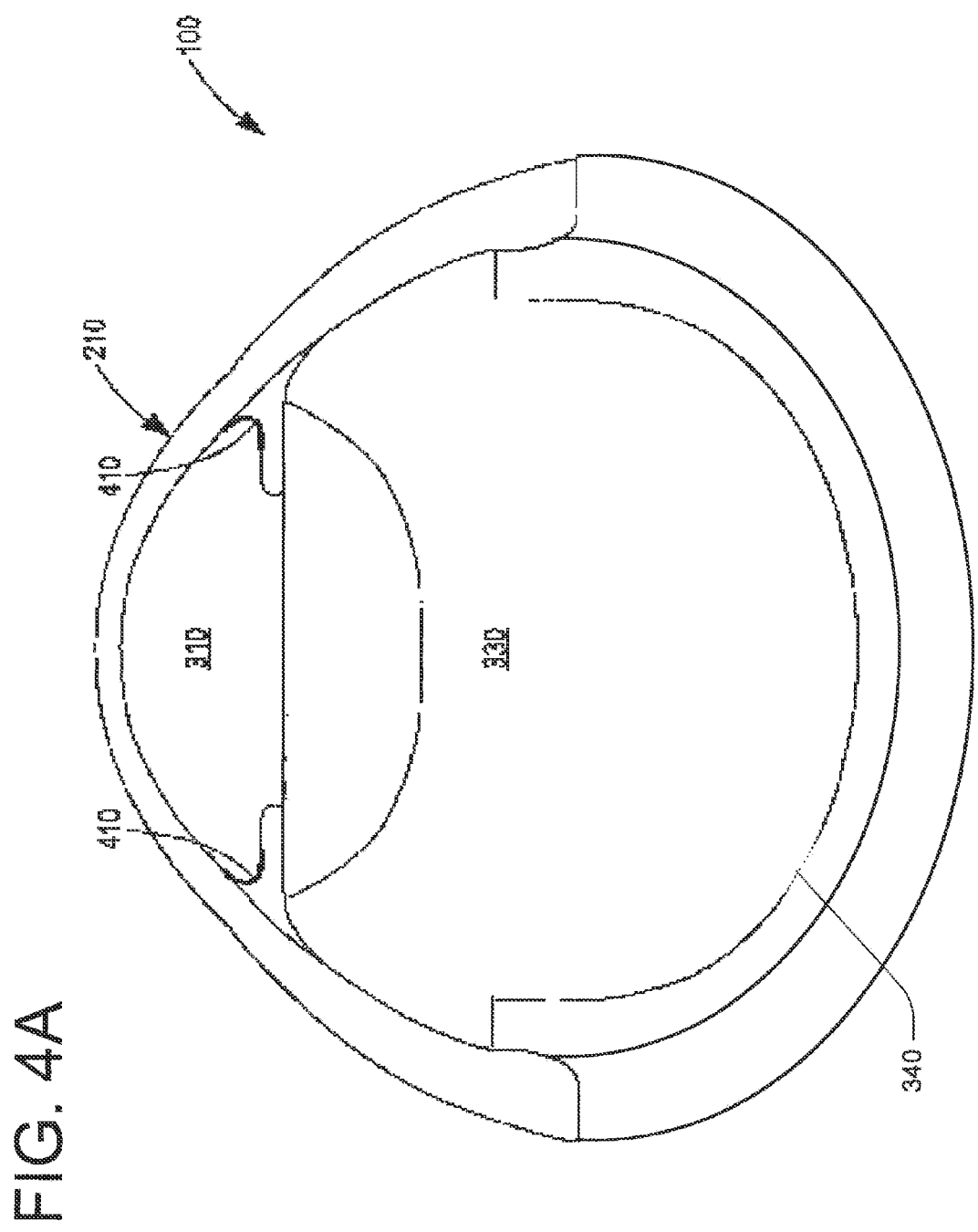
FIG. 4A is a cross-sectional view of Applicants' model eye which includes a trabecular meshwork.
Figure 4B:
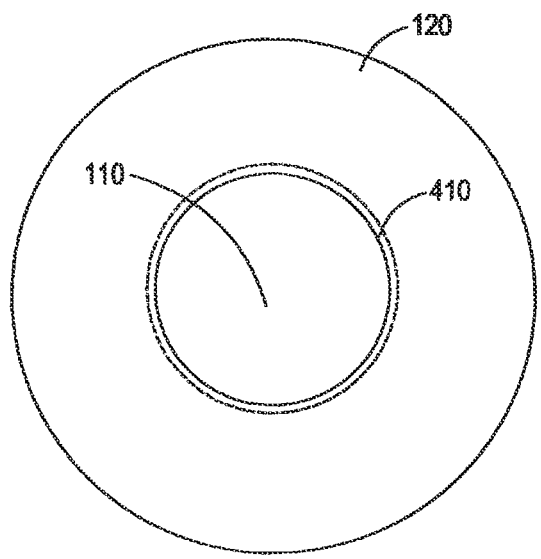
FIG. 4B is a top view of Applicants' model eye which includes a trabecular meshwork.

Referring now to FIGS. 4A and 4B, in certain embodiments Applicants' model human eye 100 comprises trabecular meshwork 410. The trabecular meshwork 410 is an area of tissue in the eye located around the base of the cornea, near the ciliary body, and is responsible for draining the aqueous humor from the eye via the anterior chamber (the chamber on the front of the eye covered by the cornea). The tissue is spongy and lined by trabeculocytes; it allows fluid to drain into a set of tubes called Schlemm's canal flowing into the blood system.

Argon laser trabeculoplasty (ALT) is a procedure which has been proven to be efficacious for different types of glaucoma. The procedure has been used for many years and continues to be a powerful tool in the armamentarium of ophthalmologists for glaucoma treatment. ALT is often recommended when medical therapy alone is insufficient in controlling pressure and the progression of glaucoma. However, it has recently been advocated by some as primary therapy in the treatment of glaucoma, especially for those patients who have contraindications to glaucoma medications or, for any reason, are unable to use eye drops.

Referring now to FIG. 4C, in the ALT procedure a procedure contact lens 400 is placed over the cornea, and lasing device 420 is positioned such that laser beam 430 is reflected from reflector 440, and reflected laser beam 450 is directed into the trabecular meshwork 410, which is the primary aqueous (fluid) drainage region of the eye. In most cases, 360 degrees of the trabecular meshwork 410 is treated with laser spots during two sessions wherein each session treats 180 degrees. Each session typically requires about 40 to 80 laser applications.

The effect of the procedure is increased drainage of aqueous fluid out of the eye, thereby lowering the intraocular pressure. The embodiment of Applicants' model human eye 100 shown in FIGS. 4A, 4B, and 4C, can be used by eye surgeons to practice the ALT procedure.

Alternatively, applicants' model human eye 100 shown in FIGS. 4A, 4B, and 4C can further be used by eye surgeons to practice implanting trabecular meshwork stents, shunts, or other implants. The implants are small devices that are inserted into the eye to create a pathway for aqueous humor to drain from the anterior chamber thereby relieving intraocular pressure.

Figure 10A:
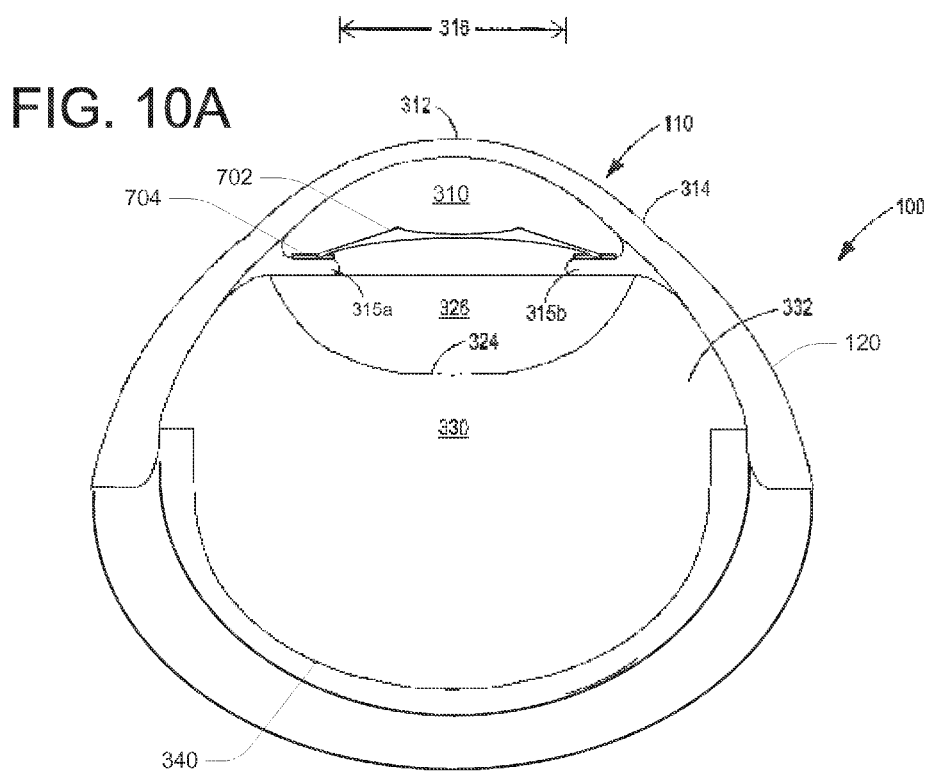
FIG. 10A is a side view of an embodiment of Applicants' model eye that can used by surgeons to practice implanting phakic intraocular lenses (P-IOL)

In the implant procedure, the implant is delivered preloaded on the tip of a 26-gauge applicator. A surgeon inserts the applicator through an incision in cornea portion 110 and traverses anterior chamber 310 to trabecular meshwork 410 where the implant is advanced into trabecular meshwork 410 and is tapped into place. Referring now to FIGS. 10A and 10B, Applicants' model human eye 100 further comprises layer 704 over iris 315, wherein layer 704 comprises a thin nylon layer. The embodiment of Applicants' model human eye 100 as shown in FIGS. 10A and 10B can further be used by surgeons to practice implanting phakic intraocular lenses (P-IOL) inside the eye to reduce refractive error. P-IOLs are an alternative to conventional or wavefront Lasik for patients with very high myopic vision. For such individuals, Lasik or other similar laser eye surgery may require significant amounts of corneal tissue to be removed to correct for high refractive errors, making the cornea thin and unstable. P-IOLs do not thin the cornea and therefore avoid such issues.

As can be seen in the illustrated embodiments of FIGS. 10A and 10B, a P-IOL, such as an Artisan or Verisyse lens, here illustrated as P-IOL 702, is inserted between iris 315 and cornea portion 110 via a small incision in cornea portion 110. P-IOL 702 is then centered over pupil 706, and is attached to layer 704 over iris 315 to hold P-IOL 702 in place. The incision is finally closed with stitches.

While the learning curve for P-IOL surgery is relatively short, it is steep. Intraocular surgery carries the risk of damage to other structures in the eye, such as the lens, the iris, and the trabecular meshwork and thus complications include trauma induced cataracts, glaucoma, iritis, and also retinal complications such as cystoid macular oedema and retinal detachment. Applicants' model human eye 100 shown in FIGS. 10A and 10B, can be used by eye surgeons to gain experience implanting P-IOLs such as P-IOL 702.

Referring now to FIG. 11, in certain embodiments capsular bag 320 of Applicants' model human eye 100 is distended to mimic the structure of the capsular bag in an aging patient. In such an embodiment, capsular bag 320 may comprise 30% more volume. In other such embodiments, capsular bag 320 may comprise greater than 30% more volume.

Applicants' model human eye 100 shown in FIG. 11 can be used by eye surgeons to gain experience implanting IOLs in older patients. In the implant procedure, an IOL, such as IOL 720, is implanted into the eye to replace the existing crystalline lens because it has been clouded over by cataracts, or as a form of refractive surgery to change the eye's optical power. IOL 720 is a small plastic lens with plastic side struts to hold IOL 720 in place within capsular bag 320. After removing the original lens, IOL 720 is inserted via a small incision in cornea portion 110 and secured to capsular bag 320.

Figure 5:
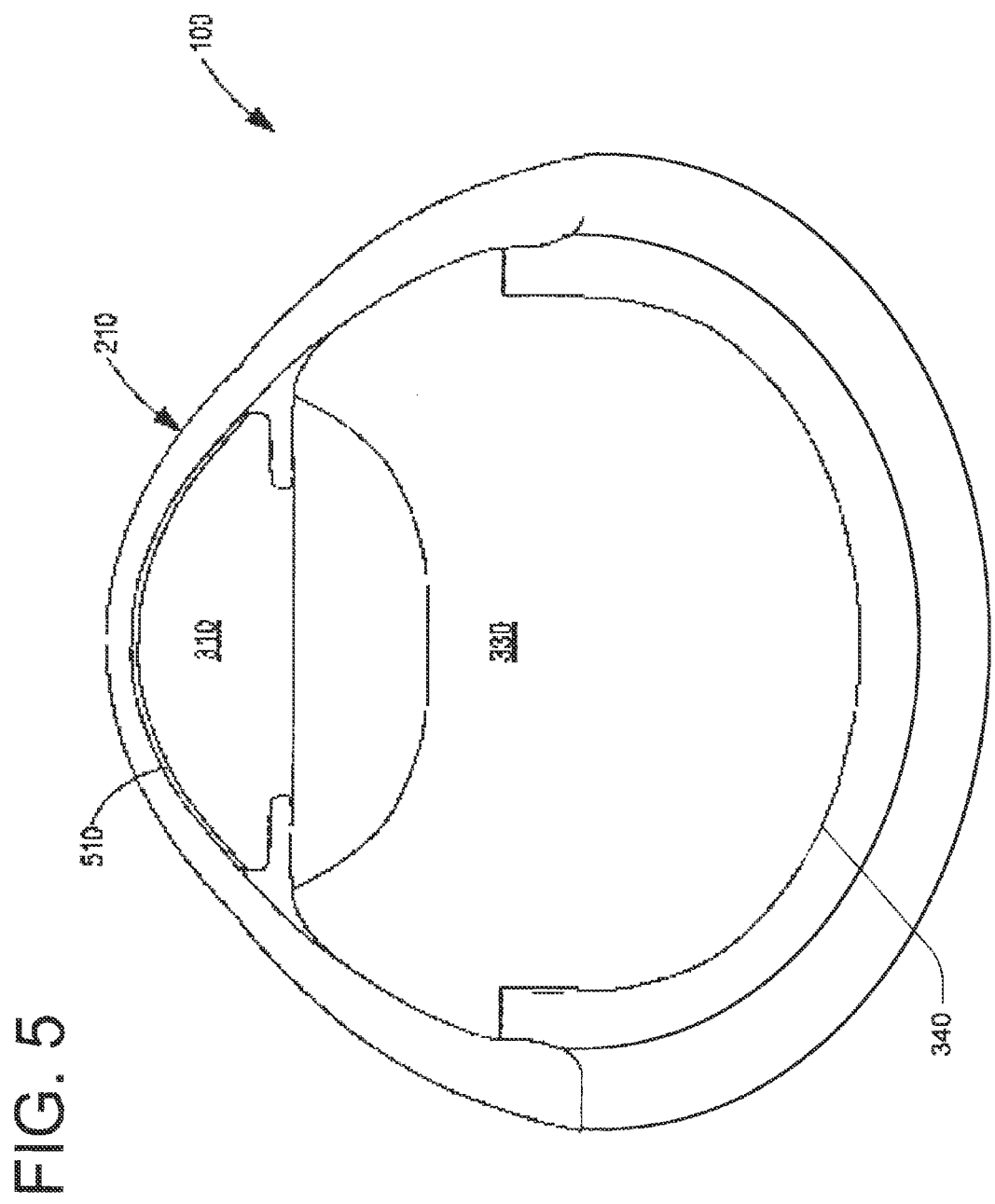
FIG. 5 is a cross-sectional view of Applicants' model eye which includes an endothelium layer.

In the illustrated embodiment of FIG. 5, Applicants' model human eye 100 comprises an endothelial layer 510. Descemet's membrane is the basement membrane that lies between the corneal proper substance, also called stroma, and the endothelial layer 510 of the cornea. The endothelial layer is located at the posterior portion of the cornea. Descemet's membrane, as the basement membrane for the endothelial layer, is secreted by the single layer of cuboidal epithelial cells that compose the endothelial layer of the cornea. Its thickness ranges from 3 μm at birth to 8-10 μm in adults.

Endothelial dysfunction from disease or trauma is one of the leading indications for corneal transplantation. Over the past one hundred years, one solution for endothelial replacement was through full thickness corneal transplantation. While penetrating keratoplasty (PK) has been shown to yield healthy donor tissue with good endothelial function, this procedure has been plagued by the inherent problems of unpredictable surface topography, retained surface sutures, poor wound strength, and graft rejections.

A surgical technique known as Deep Lamellar Endothelial Keratoplasty (DLEK) accomplishes the goal of endothelial replacement without ever touching the surface of the recipient cornea. By eliminating surface corneal sutures and incisions, the advantages of normal corneal topography and faster wound healing were obtained, leading to faster visual rehabilitation and a more stable globe for the patient.

"Descemets Stripping Endothelial Keratoplasty", or "DSEK" has the advantage of being easier for the surgeon to perform and of providing a smoother interface on the recipient side for the visual axis. Using the DSEK procedure, the endothelial layer 510 is stripped away, and a replacement layer is transplanted. The embodiment of Applicants' model human eye 100 shown in FIG. 5 can be used to practice the DSEK procedure.

Figure 8A:
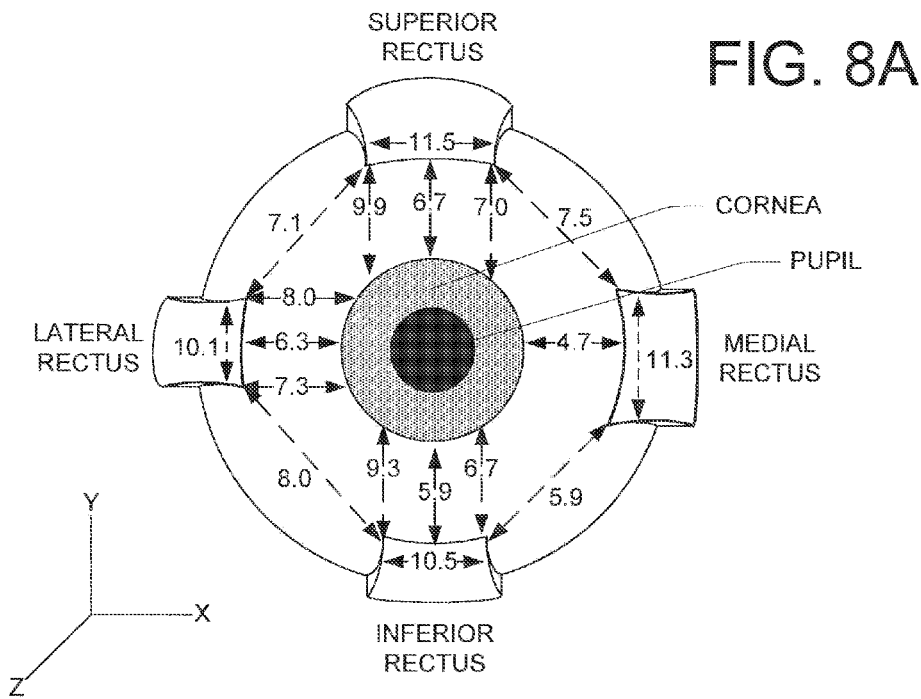
FIG. 8A illustrates a human eye with rectus muscles.
Figure 8B:
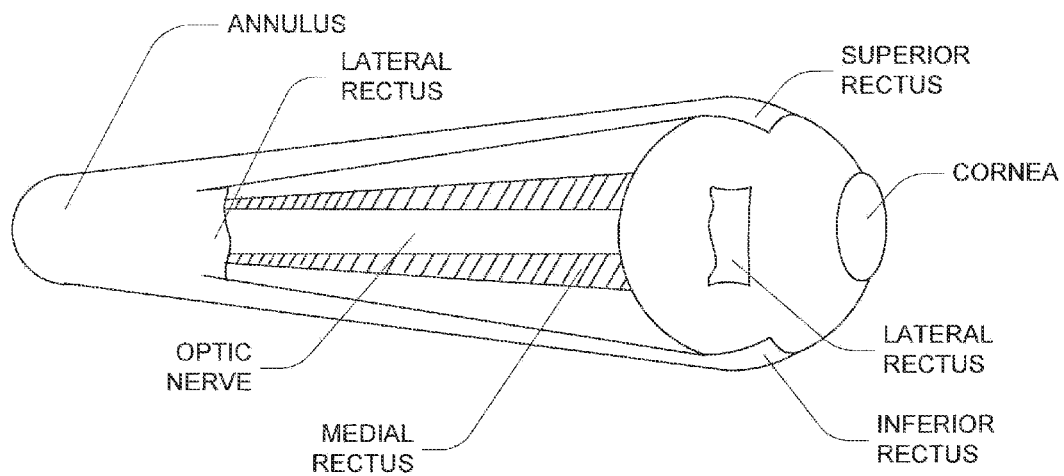
FIG. 8B is a side view of a human eye with rectus muscles.

In certain embodiments, Applicants' model eye comprises rectus muscles. Referring to FIGS. 8A and 8B, the human eye comprises extraocular muscles including the superior rectus, inferior rectus, medial rectus, and lateral rectus. Due to the insertions of the rectus muscles not being equidistant from the limbus, the rectus muscles lie on a spiral (known as the spiral of Tillaux) rather than a circle that is concentric with the limbus. The insertion of the medial rectus is closest to the limbus, followed by the inferior, lateral, and superior rectus insertions, in that order.

The lines of insertion generally have a slight curvature toward the limbus. The straightest are the medial and lateral rectus muscles while the lines of insertion of the superior and inferior rectus muscles are markedly convex toward the limbus and run obliquely upward and laterally. Thus, as can be seen in the illustrated embodiment of FIG. 8A, the temporal ends of the insertions of the superior and inferior rectus muscles are further from the limbus than the nasal ends. As will be understood by one of ordinary skill in the art, the amount of obliquity varies in different eyes and the average measurements, in millimeters, provided by FIG. 8A are illustrative only. Furthermore, a person of ordinary skill in the art will know that there is a substantial difference between the mean anatomical data obtained from adult eyes as compared to that obtained from newborn eyes.

Figure 9A:
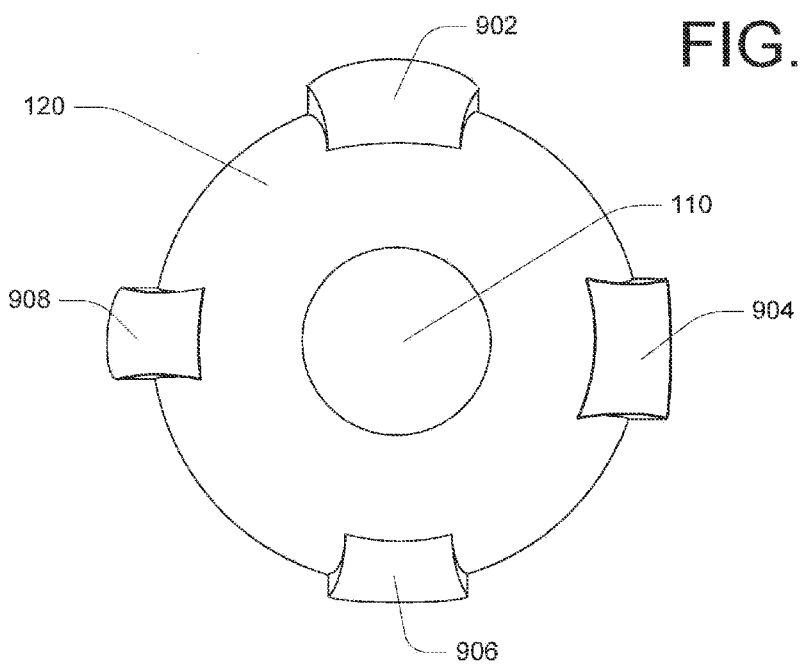
FIG. 9A is a top view of Applicants' model eye including rectus muscle portions.
Figure 9B:
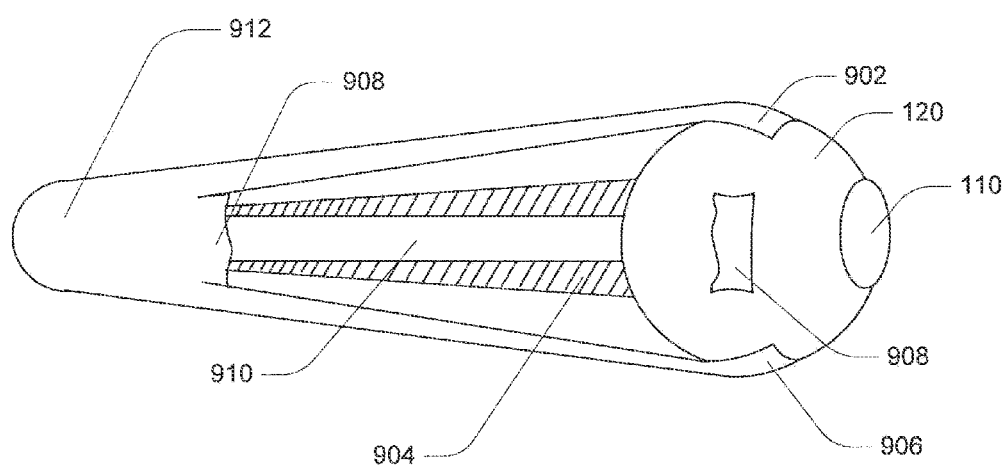
FIG. 9B is a cross sectional view of Applicants' model eye including rectus muscle portions.

As can be seen in the illustrated embodiment of FIG. 9B, the superior, inferior, medial, and lateral rectus muscles originate in the back of the orbit in a fibrous ring called the annulus of Zinn (also known as the annular tendon or common tendinous ring) and extend forward onto the anterior half of the eyeball. The optic nerve extends between the annulus of Zinn and the eyeball and is surrounded by the superior, inferior, medial, and lateral rectus muscles.

Figure 9C:
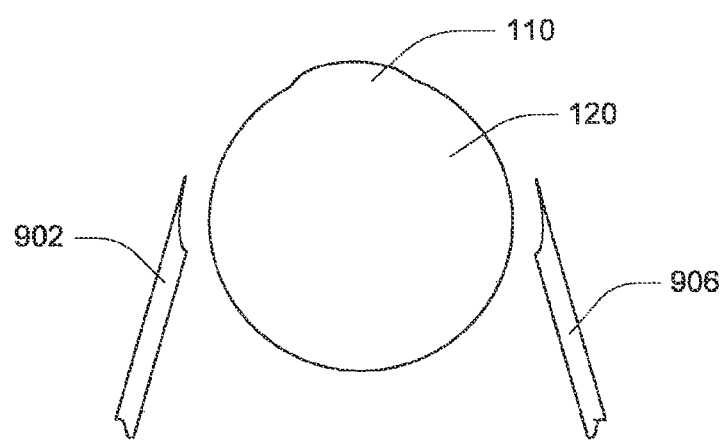
FIG. 9C is an exploded view of Applicants' model eye including rectus muscle portions.

Turning to FIGS. 9A, 9B, and 9C, Applicants' model human eye 100 further comprises four rectus muscle portions, 902, 904, 906, and 908, corresponding to the superior, inferior, medial, and lateral rectus muscles. In certain embodiments, the end of each of the rectus muscle portions that is in contact with sclera portion 120 is tapered, as can be seen in the illustrated embodiment of FIG. 9C.

In certain embodiments, the rectus muscle portions 902, 904, 906, and 908, comprise an elastomeric material. In certain embodiments, the rectus muscle portions 902, 904, 906, and 908, are formed to include striations therein to mimic the texture of muscle. In certain embodiments, the mechanical properties of each of the rectus muscle portions are substantially the same as each of the rectus muscles. By substantially, Applicants mean within ten percent (10%). By way of example and not limitation, mechanical properties include tear strength, cut initiation strength, cut propagation strength, toughness (stress-strain curve), tensile strength, compressional strength, torsional strength, impact strength, flexural strength, ultimate elongation, and elastic elongation.

In certain embodiments, the dimensions and alignment of each the rectus muscle portions 902, 904, 906, and 908, are substantially the same as the average dimensions and alignment of each of the rectus muscles of a human adult. In such embodiments, the length of the each of the rectus portions is about 40 mm. In such embodiments, the width of each rectus muscle portion is about 10 mm. In such embodiments, the insertion of the medial rectus muscle portion is about 5.5 mm from the limbus. In such embodiments, the insertion of the lateral rectus muscle portion is about 6.9 mm from the limbus. In such embodiments, the insertion of the superior rectus muscle portion is about 7.7 mm from the limbus. In such embodiments, the insertion of the inferior rectus muscle portion is about 6.5 mm from the limbus.

In certain embodiments, the dimensions and alignment of each of the rectus muscles 902, 904, 906, and 908, are substantially equal to the dimensions and alignment of each of the rectus muscles of a human newborn. In certain embodiments, the dimensions and alignment of each of the rectus muscle portions 902, 904, 906, and 908, are characteristic of a physical disorder such as, by way of example and not limitation, strabismus, nystagmus, and Duane syndrome.

As will be known to a person of ordinary skill in the art, the extraocular muscles enable the eyes to move up, down, to the side, and any angle in between. While normally, the eyes move together, each receiving the same image on corresponding locations on the retinas, in a person suffering from strabismus, one or both of the eyes will deviate out of alignment, either outwardly (exotropia) or toward the nose (esotropia), causing the brain to receive two different images and resulting in either one image being suppressed or in double vision (diplopia). One method of treating strabismus is through eye muscle surgery to weaken, strength, or reposition the appropriate muscles to restore the eye alignment and promote binocular vision.

Weakening an extraocular muscle generally involves recessing the muscle, or moving it posteriorly on the sclera to elongate the muscle. Conversely, extraocular muscles are strengthened through resection, or removing a portion of the muscle, thereby shortening it. Typically resection involves removing a portion of the muscle near the point of insertion and then reinserting the muscle into its original location. For some forms of strabismus, the insertion point of an extraocular muscle is relocated, rather than weakening or strengthening the muscle.

Surgery to strengthen, weaken, or reposition the extraocular muscles involves making an incision in the conjunctiva and placing sutures in the muscle to hold it in place. The muscle is then loosened from the sclera using a surgical hook. If the muscle is being resected, a portion is removed and the remaining muscle is reattached to the same place. In a recession, the muscle is repositioned posteriorly on the sclera.

As can be seen in the illustrated embodiment of FIG. 9B, Applicant's model human eye 100 further comprises an annulus of Zinn portion 912 and an optic nerve portion 910. In certain embodiments, the annulus of Zinn portion 912 comprises a cone-shaped elastomeric assembly. In certain embodiments, the optic nerve portion 910 comprises a cylindrical member extending outwardly from sclera portion 120 to the annulus of Zinn portion 912.

Figure 6A:
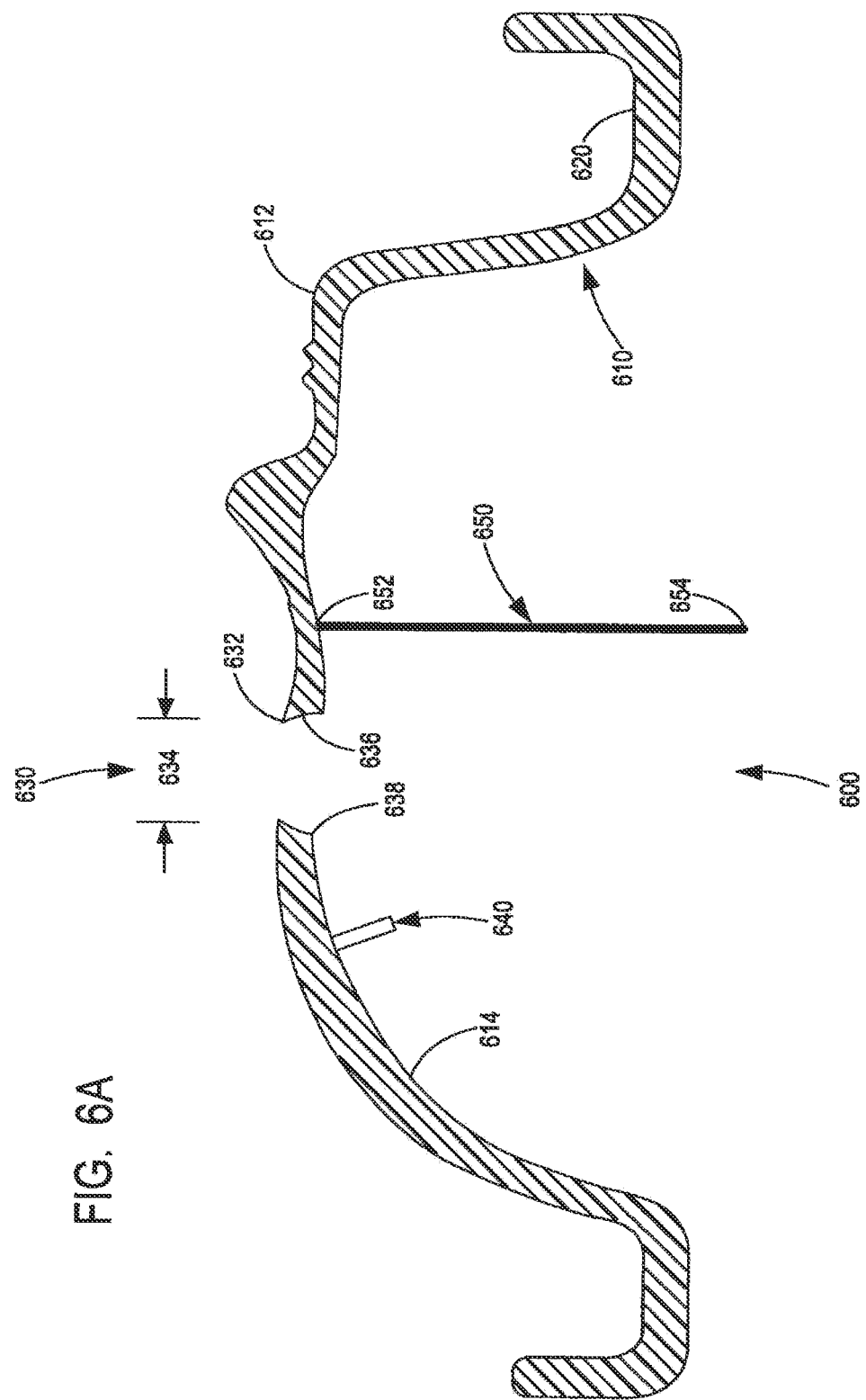
FIG. 6A is a cross-sectional view of Applicants' face manikin formed to releasably accept Applicants' model human eye.

Referring now to FIGS. 6A and 6B, in certain embodiments Applicants' invention further comprises a face manikin 600 formed to mimic a human-face. Face manikin 600 comprises a raised, face-mimicking structure 610 surrounded by a trough 620. Many of the surgical procedures that can be learned and refined using Applicants' model human eye 100 in combination with face manikin 600 involve the use of water and/or other fluids. As those fluids drain down structure 610, trough 620 comprises an integral containment system to capture those fluids.

Face-mimicking structure 610 comprises an outer surface 612 and an inner surface 614. Face-mimicking structure 610 is formed to include two apertures 630 formed therein. Apertures 630 comprise eye sockets having a diameter 634. In certain embodiments, diameter 634 is about 20 mm.

In the illustrated embodiment of FIG. 6A, eye socket 630 is defined by a circular wall 636. Circular wall 636 comprises an arcuate shape comprising a first circumference 632 at outer surface 612 and a second circumference 638 at inner surface 614, wherein the first circumference 632 is less than the second circumference 638. In certain embodiments, arcuate wall 636 comprises a radius of curvature of about 12 mm.

The arcuate shape of wall 636 allows Applicants' model human eye 100, when fixtured to face manikin 600, to be manually rotated in small increments with respect to the surrounding eye socket 630. Such movement of Applicants' model human eye 100 within eye socket 630 closely mimics the actual movement of a human eye.

Face manikin 600 further comprises a flexible attachment strap 650, wherein a first end of strap 650 is attached to inner surface 614. Face manikin 600 further comprises a buckle assembly 640 attached to inner surface 614, wherein buckle assembly 640 is attached to inner surface 614 adjacent a first side of eye socket 630, and one end of flexible strap 650 is attached to inner surface 614 adjacent an opposing second side of eye socket 630. In certain embodiments, one surface of distal end 654 of strap 650 comprises a plurality of loop-type fasteners, and a second and opposing surface of distal end 654 comprises a plurality of hook-type fasteners.

Figure 7D:
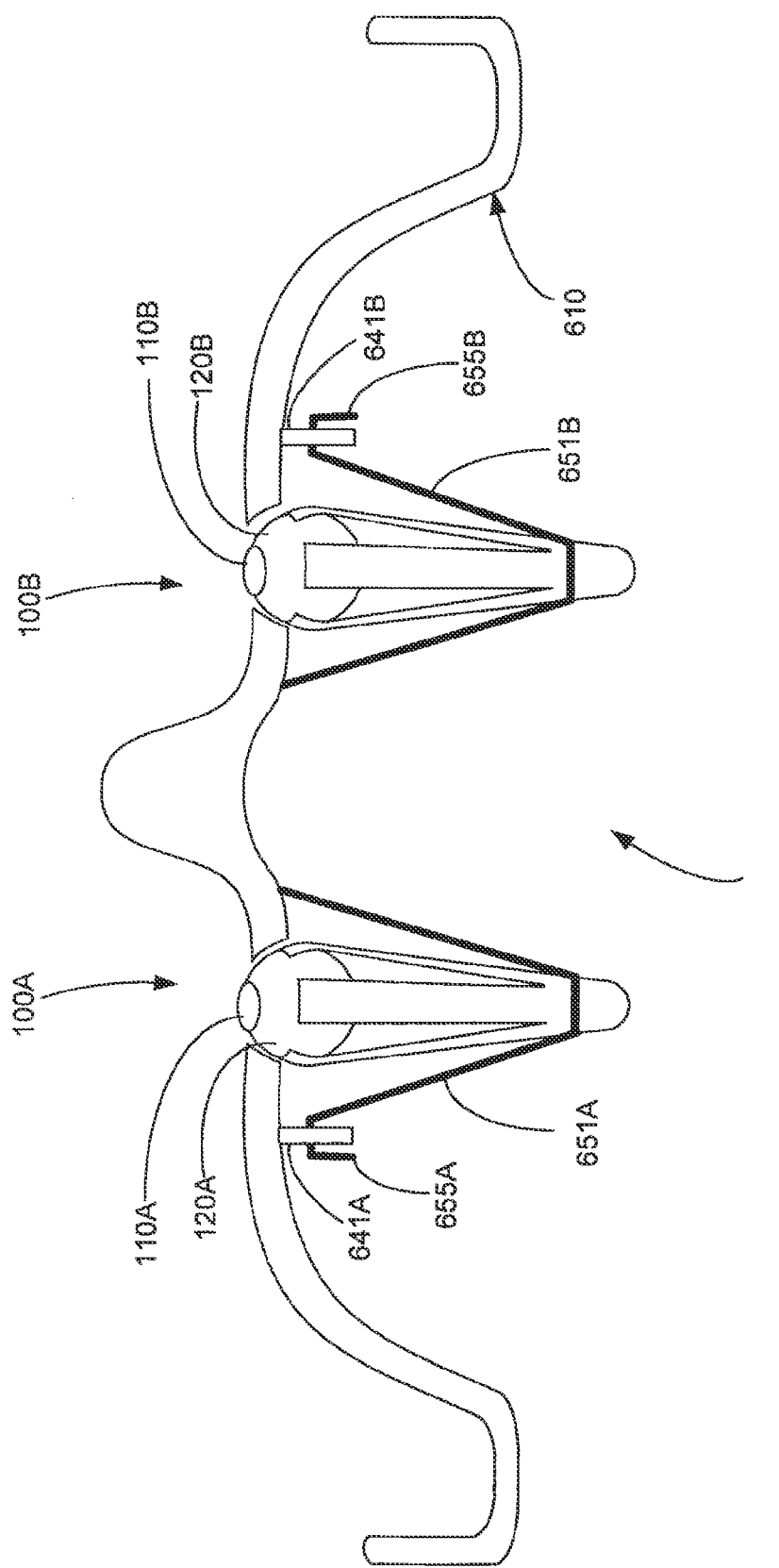
FIG. 7D is an alternative view of the face manikin with a model human eye removeably affixed thereto of FIG. 7C.

Referring now to FIGS. 7A, 7B, 7C, and 7D, FIGS. 7A and 7C show Applicants' model human eye 100 removeably attached to face manikin 600 such that cornea portion 110 and sclera portion 120 extend through eye socket 630. In the illustrated embodiment of FIGS. 7A and 7C, distal end 654 of flexible strap 650 is shown threaded through buckle assembly 640, such that flexible strap 650 fixtures model eye in place. An alternative view of face manikin 600 having Applicants' model human eyes 100A and 100B removeably attached is depicted in FIG. 7D. In FIG. 7D, distal ends 655A and 655B of flexible straps 651A and 651B are shown threaded through buckle assemblies 641A and 641B, such that flexible straps 651A and 651B fix model eye 100A and 100B in place, respectively. The model human eye 100 element can be used for one or more surgical procedures, and then replaced with a new model human eye 100. The used model eyes can be retained for evaluation. Thereafter, the used model human eyes 100 can be classified as solid waste rather than as a hazardous waste or infectious waste for purposes of the federal Occupational Safety and Health Act, Resource Conservation and Recovery Act, and the various state-law analogs.

While the preferred embodiments of the present invention have been illustrated in detail, it should be apparent that modifications and adaptations to those embodiments may occur to one skilled in the art without departing from the scope of the present invention as set forth in the following claims.

We claim:

1. A model human eye, comprising:
    a hemispherical-shaped, bottom assembly comprising a bowl-shaped substrate disposed therein;
    a hemispherical-shaped, integrally molded top assembly comprising a visually transparent cornea portion surrounding a visually opaque sclera portion, wherein the sclera portion comprises an inner surface;
    wherein said top portion is attached to said bottom portion to define a posterior chamber;
    a cylindrical member attached to said sclera portion with a distal end extending outwardly therefrom;
    a cone-shaped elastomeric assembly attached to said distal end of said cylindrical member;
    four elastomeric members attached to said cone-shaped elastomeric assembly and extending outwardly therefrom, wherein a distal end of each elastomeric member is attached to said sclera portion and wherein each of said elastomeric members is formed to include striations therein;
    wherein said model human eye is dimensioned for practicing surgical techniques selected from the group consisting of extraocular muscle resection and extraocular muscle recession.

2. The model human eye of claim 1, further comprising:
    an annular iris continuously attached to said inner surface and extending inwardly therefrom; and
    a nylon layer disposed over said iris.

3. The model human eye of claim 2, further comprising a trabecular meshwork portion superimposed on an outer portion of said iris, wherein said trabecular meshwork is structurally suited for practicing surgical techniques selected from the group consisting of:
    trabecular meshwork implant; and
    argon laser trabeculoplasty.

4. The model of the human eye of claim 1, wherein said first elastomeric member has an insertion about 5.5 mm from said cornea portion, wherein said second elastomeric member has an insertion about 6.9 mm from said cornea portion, wherein said third elastomeric member has an insertion about 7.7 mm from said cornea portion, wherein said fourth elastomeric member has an insertion about 6.5 mm from said cornea portion.

5. The model of the human eye of claim 1, wherein each of said elastomeric members has a width of about 10 mm.

6. The model of the human eye of claim 1, wherein each of said elastomeric members has a length of about 40 mm.

7. The model of the human eye of claim 1, wherein said first elastomeric member comprises an ultimate elongation substantially the same as an adult superior rectus muscle, wherein said second elastomeric member comprises an ultimate elongation substantially the same as an adult inferior rectus muscle, wherein said third elastomeric member comprises an ultimate elongation substantially the same as an adult lateral rectus muscle, wherein said fourth elastomeric member comprises an ultimate elongation substantially the same as an adult medial rectus muscle.

8. The model of the human eye of claim 1, wherein said first elastomeric member comprises a tensile strength substantially the same as an adult superior rectus muscle, wherein said second elastomeric member comprises a tensile strength substantially the same as an adult inferior rectus muscle, wherein said third elastomeric member comprises a tensile strength substantially the same as an adult lateral rectus muscle, wherein said fourth elastomeric member comprises a tensile strength substantially the same as an adult medial rectus muscle.

9. The model of the human eye of claim 1, wherein said first elastomeric member comprises a flexural strength substantially the same as an adult superior rectus muscle, wherein said second elastomeric member comprises a flexural strength substantially the same as an adult inferior rectus muscle, wherein said third elastomeric member comprises a flexural strength substantially the same as an adult rectus muscle, wherein said fourth elastomeric member comprises a flexural strength substantially the same as an adult medial rectus muscle.

10. The model of the human eye of claim 1, wherein said first elastomeric member comprises a toughness substantially the same as an adult superior rectus muscle, wherein said second elastomeric member comprises a toughness substantially the same as an adult inferior rectus muscle, wherein said third elastomeric member comprises a toughness substantially the same as an adult lateral rectus muscle, wherein said fourth elastomeric member comprises a toughness substantially the same as an adult medial rectus muscle.

11. The model of the human eye of claim 1, wherein said distal end of each elastomeric member is tapered.

12. A method to practice surgical techniques on a model human eye, comprising:
supplying a model human eye comprising:
a hemispherical-shaped, bottom assembly comprising a bowl-shaped substrate disposed therein;
a hemispherical-shaped, integrally molded top assembly comprising a visually transparent cornea portion surrounding a visually opaque sclera portion, wherein the sclera portion comprises an inner surface;
wherein said top portion is attached to said bottom portion to define a posterior chamber;
a cylindrical member attached to said sclera portion with a distal end extending outwardly therefrom;
a cone-shaped elastomeric assembly attached to said distal end of said cylindrical member;
four elastomeric members attached to said cone-shaped elastomeric assembly and extending outwardly therefrom, wherein a distal end of each elastomeric member is attached to said sclera portion;
wherein a first elastomeric member has an insertion about 5.5 mm from said cornea portion, wherein a second elastomeric member has an insertion about 6.9 mm from said cornea portion, wherein a third elastomeric member has an insertion about 7.7 mm from said cornea portion, wherein a fourth elastomeric member has an insertion about 6.5 mm from said cornea portion;
supplying a face manikin formed to mimic a human-face comprising a raised, face-mimicking structure surrounded by a trough, wherein said face-mimicking structure comprises two eye sockets extending therethrough, an exterior surface, and an interior surface, two attachment straps wherein each attachment strap comprises a first end attached to said interior surface adjacent one of the eye sockets, two attachment buckles wherein each attachment buckle attached to said interior surface adjacent one of the eye sockets;
wherein said exterior surface comprises:
an eye brow element disposed adjacent a first side of each eye socket;
a nose feature disposed between the eye sockets and adjacent a second an opposing side of the eye sockets; and
and a mouth feature disposed adjacent the nose feature;
said method further comprising:
positioning said model eye against the interior surface of said face-mimicking structure such that the cornea portion extends outwardly from an eye socket; and
releaseably attaching said model eye to said face-mimicking structure using an attachment strap and an attachment buckle.

13. The method of claim 12, further comprising:
practicing a surgical procedure using said model eye; and
removing said used model eye from said face-mimicking structure.

14. The method of claim 12, wherein said method further comprises:
placing a first suture in at least one of said elastomeric members; and
loosening said at least one elastomeric member from said sclera portion.

15. The method of claim 14, further comprising:
removing a portion of said at least one elastomeric member;
reattaching said at least one elastomeric member to said sclera portion by placing a second suture; and
removing said first suture.

16. The method of claim 14, further comprising:
repositioning said at least one elastomeric member; and
removing said first suture.

17. The method of claim 12, wherein said model human eye further comprises an annular iris continuously attached to said inner surface and extending inwardly therefrom and a nylon layer disposed over said iris, wherein said method further comprises attaching an intraocular lens to said nylon layer.

18. The model human eye of claim 17, wherein a trabecular meshwork portion is superimposed on an outer portion of said iris, the method further comprising implanting a trabecular meshwork into said trabecular meshwork.

19. The model human eye of claim 17, wherein a trabecular meshwork portion is superimposed on an outer portion of said iris, the method further comprising performing an argon laser trabeculoplasty.

* * * * *